United States Patent
Matsui

(10) Patent No.: US 8,355,187 B2
(45) Date of Patent: Jan. 15, 2013

(54) IMAGE READING APPARATUS AND IMAGE FORMING APPARATUS

(75) Inventor: Shinya Matsui, Osaka (JP)

(73) Assignee: Kyocera Document Solutions Inc. (JP)

( * ) Notice: Subject to any disclaimer, the term of this patent is extended or adjusted under 35 U.S.C. 154(b) by 361 days.

(21) Appl. No.: 12/822,306

(22) Filed: Jun. 24, 2010

(65) Prior Publication Data

US 2010/0328735 A1    Dec. 30, 2010

(30) Foreign Application Priority Data

Jun. 30, 2009   (JP) ................................. 2009-155229
Jun. 30, 2009   (JP) ................................. 2009-155230

(51) Int. Cl.
*H04N 1/04*    (2006.01)

(52) U.S. Cl. ........ 358/488; 358/474; 358/475; 358/523; 382/274; 382/275; 399/302

(58) Field of Classification Search .................. 358/501, 358/523, 530, 488, 474, 475, 498, 1.16, 516, 358/413, 3.26, 463; 382/274, 275, 190; 399/302
See application file for complete search history.

(56) References Cited

U.S. PATENT DOCUMENTS

| | | | | |
|---|---|---|---|---|
| 7,474,437 | B2 * | 1/2009 | Ishido ............................. | 358/1.9 |
| 7,558,437 | B2 * | 7/2009 | Misaka .......................... | 382/275 |
| 7,561,311 | B2 * | 7/2009 | Toyoda et al. ................. | 358/474 |
| 7,660,018 | B2 * | 2/2010 | Shimizu ....................... | 358/3.26 |
| 7,675,657 | B2 * | 3/2010 | Ishiguro et al. ............... | 358/514 |
| 7,719,731 | B2 * | 5/2010 | Saka et al. .................... | 358/514 |
| 7,742,180 | B2 * | 6/2010 | Saida et al. ................... | 358/1.14 |

FOREIGN PATENT DOCUMENTS

| | | |
|---|---|---|
| JP | 2000-310820 | 11/2000 |
| JP | 2005-045462 | 2/2005 |
| JP | 2007-300448 | 11/2007 |
| JP | 2008-028699 | 2/2008 |
| JP | 2008-193553 | 8/2008 |

* cited by examiner

*Primary Examiner* — Negussie Worku
(74) *Attorney, Agent, or Firm* — Ostrolenk Faber LLP

(57) ABSTRACT

An image reading apparatus includes a timing predicting unit that predicts a reading-start-timing by detecting a front-end and predicts a reading-end-timing by detecting a back-end, an image reading unit that generates density data, a line density data classification unit, a first, second and third specific density data storage units, a determination unit that determines whether or not a foreign substance is attached to a reading position, and a peak density position specifying unit.

18 Claims, 20 Drawing Sheets

DIRECTION OF VERTICAL SCANNING

IMAGE READING APPARATUS AND IMAGE FORMING APPARATUS

BACKGROUND OF THE INVENTION

1. Field of the Invention

The present invention relates to an image reading apparatus and an image forming apparatus. More specifically, the present invention relates to an image reading apparatus and an image forming apparatus that detect and remove a black line that appears in image data, when a plurality of documents, which are successively transmitted in a direction of vertical scanning, are read to generate the image data.

Priority is claimed on Japanese Patent Applications No. 2009-155229, filed Jun. 30, 2009, and No. 2009-155230, filed Jun. 30, 2009, the contents of which are incorporated herein by reference.

2. Description of the Related Art

An image reading apparatus, which is included in an image forming apparatus, reads a document at a reading position of a contact glass using a light source, a mirror, a lens, and so on to generate image data. If a foreign substance such as dust or shattered paper is attached to the contact glass, the mirror, the lens, and so on, then the image reading apparatus may read the document including the foreign substance and cause a black line in the image data.

It is not good for a user to have the black line in a printed paper and the like that the image data is printed on. Accordingly, the image reading apparatus that will not cause a black line is required. A method of detecting the black line that appears in the image data is used in some prior art.

In the prior art, the image reading apparatus reads densities of three lines, a front-end line of the document, a back-end line of the document, and a line between documents (a line between a document and next document), in a direction of reading the document (in a direction of horizontal scanning). Then, the image reading apparatus determines whether or not the image data has a black line.

An image reading unit of the image reading apparatus reads the densities of the three lines, the front-end line of the document, the back-end line of the document, and the line between documents. The image reading unit includes a sensor that detects the front-end line of the document and the back-end line of the document and outputs detection signals. The timings of reading the densities of three lines are controlled by the detection signals from the sensor. Various factors such as abilities of the sensor and a motor, which transmits the document, may cause a gap between the timings of reading the document (especially the back-end line).

First, the front-end line of the document is detected by the sensor. Then, reading of the document is started at a reading position at a predetermined time after the timing of detecting the front-end line of the document. The gap between the timing of detecting the front-end line of the document and the timing of reading the front-end line of the document can be reduced in part by adjusting the above predetermined time.

The document that is read may be irregular in size. Therefore, a method of detecting the front-end line of the document by the sensor and reading the document at the reading position of the back-end line at a predetermined time after the timing of detecting the front-end line of the document cannot be adopted. It is necessary to detect the back-end line of the document by the sensor and read the document at the reading position of the back-end line at the predetermined time after the timing of detecting the back-end line of the document.

If the back-end line of the document has passed through the reading position when the detection signal of the back-end line of the document from the sensor is received by the image reading unit, then the position of the document, which is at the reading position of the back-end line at the predetermined time after the timing of detecting the back-end line of the document, cannot be read. In this case, the gap between the timings of reading the back-end line of the document cannot be reduced by adjusting the predetermined time like the case of the front-end line of the document.

To solve this problem, a method of sampling all horizontal scanning lines (all data of one piece of document) that have been read is conceivable. However, this method requires a large memory and is not realistic.

In the prior art, if the black line is detected, then the reading position of the image reading apparatus is changed and the document is read again. Correcting the detected black line is not considered. However, a user may want the read image to be corrected instead of having the document read again.

SUMMARY

An image reading apparatus that reads a document being transmitted in a direction of vertical scanning may include a timing predicting unit that predicts a reading-start-timing of the document by detecting a front-end of the document, the timing predicting unit predicting a reading-end-timing of the document by detecting a back-end of the document, an image reading unit that starts reading a horizontal scanning line of the document at the reading-start-timing, the image reading unit reading a line between documents at the reading-end-timing, the image reading unit generating density data of pixels on one of the horizontal scanning line of the document and the line between documents, a line density data classification unit that classifies the density data, which has been generated by the image reading unit, into first density data of a first line, second density data of a second line, and third density data of a third line, the first line being the horizontal scanning line that is a predetermined distance backward from the front-end, the second line being the horizontal scanning line of the document other than the first line, the third line being the line between documents, a first specific density data storage unit that stores the first density data as first specific density data, a second specific density data storage unit that stores a plurality of number of the second density data as second specific density data, including the second density data of a latest line that is the horizontal scanning line being read at the reading-end-timing, a third specific density data storage unit that stores the third density data as third specific density data, a determination unit that determines whether or not a foreign substance is attached to a reading position at which the image reading unit reads the document based on at least one of the first, second and third specific density data, and a peak density position specifying unit that specifies a peak density position of one of the first, second and third lines based on one of the first, second and third specific density data corresponding to one of the first, second and third lines, the peak density position being a position of a pixel that has a density value more than a first predetermined density standard value in one of the first, second and third lines. If a difference of distance in a direction of horizontal scanning between the peak density position of one of the first, second and third lines and the peak density position of another one of the first, second and third lines is less than a predetermined distance and a density value of the pixel at the peak density position is more than a second predetermined density standard value, then the determination unit determines that the foreign substance is attached to the reading position.

Whenever the reading-end-timing may come, a plurality of density data from a latest density data to the density data that is a predetermined number before are stored at the reading-end-timing. Even if the latest density data is the density data of the line between documents, at least one of the plurality of density data is the density data near the back-end of the document. Therefore, the plurality of density data including the density data near the back-end of the document can be made as a standard of judging a black line.

The determination unit may use the peak density position and the peak density value of the acquired specific density data as a standard for determination.

The number of the lines corresponding to the density data that the line density data classification unit classifies may be set arbitrarily.

The number of the second specific density data that the second specific density data storage unit stores may be set arbitrarily.

The reading position at the reading-end-timing is inclined to move about 10 lines from the back-end of the document. By selecting the horizontal scanning line in each 9 lines, for example, the interval distance between one of the horizontal scanning line and another one of the horizontal scanning line, which the line density data selecting unit has selected, becomes 8 lines. Then, the density data near the back-end of the document can be selected.

The image reading apparatus may further include an avoidance unit that changes the reading position, if the determination unit determines that the foreign substance is attached to the reading position.

The image reading apparatus of the present invention selects the density data of each predetermined number of horizontal scanning line, and stores a predetermined number of the density data including the latest density data. Even if the back-end of the document is transmitted forward from the reading position at the timing of detecting the back-end, the determination of the black line can be performed using the density data including the density data near the back-end of the document by including the predetermined number of the density data as the standard density data for determining the black line.

An image reading apparatus that reads a document being transmitted in a direction of vertical scanning, may include an image reading unit that reads a horizontal scanning line of the document, the image reading unit generating density data of pixels on the horizontal scanning line, a specific density data receiving unit that receives a predetermined number of specific density data, each of the specific density data being the density data that has been generated by the image reading unit, a peak density position specifying unit that specifies a peak density position of the horizontal scanning line based on the specific density data, the peak density position being a position of a pixel that has a density value more than a first predetermined density standard value in the horizontal scanning line, and a foreign substance area specifying unit that specifies a foreign substance area, the foreign substance area being an area where the density value of the pixel at the peak density position is more than a second predetermined density standard value, if a difference of a distance in a direction of horizontal scanning between the peak density position of one horizontal scanning line and the peak density position of another horizontal scanning line is less than a predetermined distance.

By the above configuration, the image area, where the density value of the pixels near the peak density position is equal to or more than the density standard value, is specified as the foreign substances area, and the area of the black line in the image can be specified easily.

The image reading apparatus may further include an image data storing unit that stores the density data that has been read by the image reading unit, a peak-width determination unit that calculates a peak-width of the density data based on the foreign substance area, which has been specified by the foreign substance area specifying unit, the peak-width determination unit determining whether or not the peak-width is less than a predetermined width standard value, by comparing the peak-width, which has been calculated, with the predetermined width standard value, and an image data correcting unit that acquires the foreign substance area, which has been specified by the foreign substance area specifying unit, as a correction area data, if the peak-width is equal to or less than the predetermined width standard value. The image data correcting unit corrects the density data, which has been stored by the image data storing unit, based on the correction area data.

By the above configuration, whether or not the image data can be corrected is determined by whether or not the width of the black line is within the predetermined width standard value. Therefore, it can be easily determined whether or not the black line can be corrected.

The specific density data, which has been received by the specific density data receiving unit, includes first specific density data of a first line, second specific density data of a second line, and third specific density data of a third line, the first line being the horizontal scanning line that is a first predetermined distance backward from a front-end line of the document, the second line being the horizontal scanning line that is a second predetermined distance forward from a back-end line of the document, the third line being a line between documents. If all of a first density value of pixels of the peak density position of the first line, a second density value of pixels of the peak density position of the second line, and a third density value of pixels of the peak density position of the third line are more than the second predetermined density standard value, then the foreign substance area specifying unit specifies the foreign substance area.

If all of the peak-width of the first specific density data, the peak-width of the second specific density data, and the peak-width of the third specific density data are equal to or less than the predetermined width standard value, then the image data correcting unit receives one of the foreign substance area of the first line, the foreign substance area of the second line, and the foreign substance area of the third line as the correction area data.

By the above configuration, it can be determined that the black line occurs resulting from the area between documents by referring the first, second and third specific density data in correcting the image. The cause is, for example, a foreign substances attached to the contact glass.

The image reading apparatus further includes an avoidance unit that changes a position of a light source that is irradiated to the image reading unit, if at least one of the peak-width of the first line, the peak-width of the second line, and the peak-width of the third line is more than the predetermined width standard value.

If the black line cannot be corrected, the document can be read again by changing the position of the light source. The width standard value is preferably set within 3 pixels.

By the image forming apparatus in accordance with the present invention, the width of the black line in the image data (the foreign substances area) can be calculated. By using the width of the calculated black line, it can be easily determined whether or not the black line can be corrected.

An image forming apparatus may include an image reading apparatus that reads a document being transmitted in a direction of vertical scanning to generate density data; and an image forming unit that prints the density data, which has been generated by the image reading apparatus. The image reading apparatus may include an image reading unit that reads a horizontal scanning line of the document, the image reading unit generating the density data of pixels on the horizontal scanning line, a specific density data receiving unit that receives a predetermined number of specific density data, each of the specific density data being the density data that has been generated by the image reading unit, a peak density position specifying unit that specifies a peak density position of the horizontal scanning line based on the specific density data, the peak density position being a position of a pixel that has a density value more than a first predetermined density standard value in the horizontal scanning line, and a foreign substance area specifying unit that specifies a foreign substance area, the foreign substance area being an area where a density value of the pixel at the peak density position is more than a second predetermined density standard value, if a difference of a distance in a direction of horizontal scanning between the peak density position of one horizontal scanning line and the peak density position of another horizontal scanning line is less than a predetermined distance.

The image reading apparatus may further include an image data storing unit that stores the density data that has been read by the image reading unit, a peak-width determination unit that calculates a peak-width of the density data based on the foreign substance area, which has been specified by the foreign substance area specifying unit, the peak-width determination unit determining whether or not the peak-width is less than a predetermined width standard value, by comparing the peak-width, which has been calculated, with the predetermined width standard value, and an image data correcting unit that acquires the foreign substance area, which has been specified by the foreign substance area specifying unit, as a correction area data, if the peak-width is equal to or less than the predetermined width standard value, the image data correcting unit correcting the density data, which has been stored by the image data storing unit, based on the correction area data.

The specific density data, which has been received by the specific density data receiving unit, may include first specific density data of a first line, second specific density data of a second line, and third specific density data of a third line, the first line being the horizontal scanning line that is a first predetermined distance backward from a front-end line of the document, the second line being the horizontal scanning line that is a second predetermined distance forward from a back-end line of the document, the third line being a line between documents. If all of a first density value of pixels of the peak density position of the first line, a second density value of pixels of the peak density position of the second line, and a third density value of pixels of the peak density position of the third line are more than the second predetermined density standard value, then the foreign substance area specifying unit specifies the foreign substance area.

If all of the peak-width of the first specific density data, the peak-width of the second specific density data, and the peak-width of the third specific density data are equal to or less than the predetermined width standard value, then the image data correcting unit receives one of the foreign substance area of the first line, the foreign substance area of the second line, and the foreign substance area of the third line as the correction area data.

The image reading apparatus may further include an avoidance unit that changes a position of a light source that is irradiated to the image reading unit, if at least one of the peak-width of the first line, the peak-width of the second line, and the peak-width of the third line is more than the predetermined width standard value.

The image reading apparatus may further include a timing predicting unit that predicts a reading-start-timing of the document by detecting a front-end line of the document, the timing predicting unit predicting a reading-end-timing of the document by detecting a back-end line of the document, and a line density data classification unit that classifies the density data, which has been generated by the image reading unit, into first density data of a first line, second density data of a second line, and third density data of a third line, the first line being the horizontal scanning line that is a predetermined distance backward from the front-end line, the second line being the horizontal scanning line of the document other than the first line, the third line being a line between documents, a first specific density data storage unit that stores the first density data as first specific density data, a second specific density data storage unit that stores a predetermined number of the second density data as second specific density data, including the second density data of a latest line that is the horizontal scanning line being read at the reading-end-timing, a third specific density data storage unit that stores the third density data as third specific density data, and a determination unit that determines whether or not a foreign substance is attached to a reading position at which the image reading unit reads the document based on at least one of the first, second and third specific density data. If a difference of distance in the direction of horizontal scanning between the peak density position of one of the first, second and third lines and the peak density position of another one of the first, second and third lines is less than a predetermined distance and a density value of the pixel at the peak density position is more than a second predetermined density standard value, then the determination unit determines that the foreign substance is attached to the reading position.

The number of the lines corresponding to the density data that the line density data classification unit classifies may be set arbitrarily.

The number of the second specific density data that the second specific density data storage unit stores may be set arbitrarily.

The image reading apparatus may further include an avoidance unit that changes the reading position, if the determination unit determines that the foreign substance is attached to the reading position.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative embodiments. Those skilled in the art will recognize that many alternative embodiments can be accomplished using the teaching of the present invention and that the invention is not limited to the embodiments illustrated herein for explanatory purpose. In the description below, a case when an image forming apparatus is a multifunction printer will be described as an example.

First Embodiment

A process of a basic copy function in an image forming apparatus that includes an image reading apparatus in accordance with a first preferred embodiment of the present invention will be described. The image forming apparatus in accordance with the first preferred embodiment of the present invention may be a multifunction printer, which includes a printer, a copy machine, a scanner and a fax, a digital copy machine, a printer, and so on. The image forming apparatus in accordance with the first preferred embodiment of the present invention includes a copy function, a scanner function, a facsimile function, a printer function, and so on.

Figure 1:
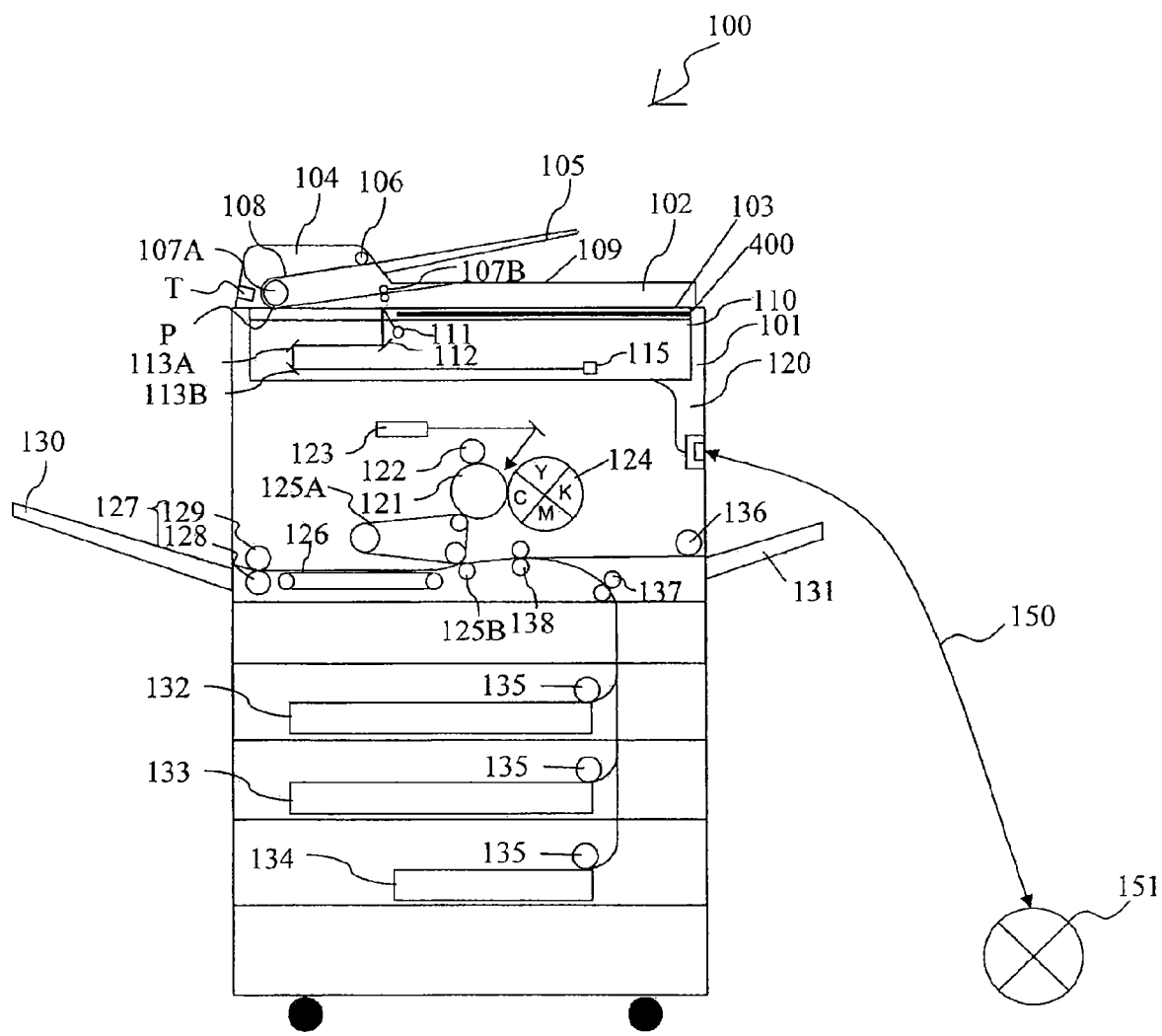
FIG. 1 is a schematic view illustrating an overall configuration of an image forming apparatus that includes an image reading apparatus in accordance with a first preferred embodiment of the present invention.

FIG. 1 is a schematic view illustrating a multifunction printer 100 in accordance with the first preferred embodiment of the present invention. The details of each part which do not directly affect the present invention are omitted. As an example, an operation of the image forming apparatus when copying a document using the multifunction printer 100 will be described.

When a user prints the document using the multifunction printer 100, the user sets the document on a document board 103 or a document feed tray 105 and instructs an operation unit 200 to start the printing of the document. The operation unit 200 is disposed near the document board 103. After the instruction by the user, each unit (operation units) of the multifunction printer 100 starts the operation, and the document is printed.

As illustrated in FIG. 1, the multifunction printer 100 in accordance with the first preferred embodiment of the present invention includes a main body 101 and a platen cover 102 that is attached on the main body 101. The document board 103 is disposed on the main body 101. The document board 103 is made open or closed by the platen cover 102. An auto document feed apparatus 104, the document feed tray 105, and an output tray 109 are attached to the platen cover 102.

The auto document feed apparatus 104 includes a document feed path 108 that is formed inside the platen cover 102, a pickup roller 106 that is disposed inside the platen cover 102, and transmitting rollers 107A and 107B. The document is transmitted through the document feed path 108. The main body 101 includes a reading unit 110 that reads the document. A reading position P, where the reading unit 110 reads the document, is disposed on the document feed path 108. The document is transmitted from the document feed tray 105 to the output tray 109 through the reading position P.

The document feed path 108 includes a sensor T. The sensor T is included in a timing predicting unit 505, which will be described below. The sensor T decides a timing of reading a front-end line and a back-end line of the document that is transmitted. The sensor T detects the front-end line of the document, adjusts the timing of reading the document, and outputs a front-end line detection signal to an image reading control unit 507.

The pickup roller 106 picks up in series a document from the plurality of documents, which are set on the document feed tray 105. The pickup roller 106 transmits the picked-up document to the document feed path 108. The document is transmitted by the transmitting roller 107A to pass through the reading position P. The document, which has passed through the reading position P, is transmitted to the output tray 109 by the transmitting roller 107B. When the document passes through the reading position P, the reading unit 110 reads the document.

Figure 2:
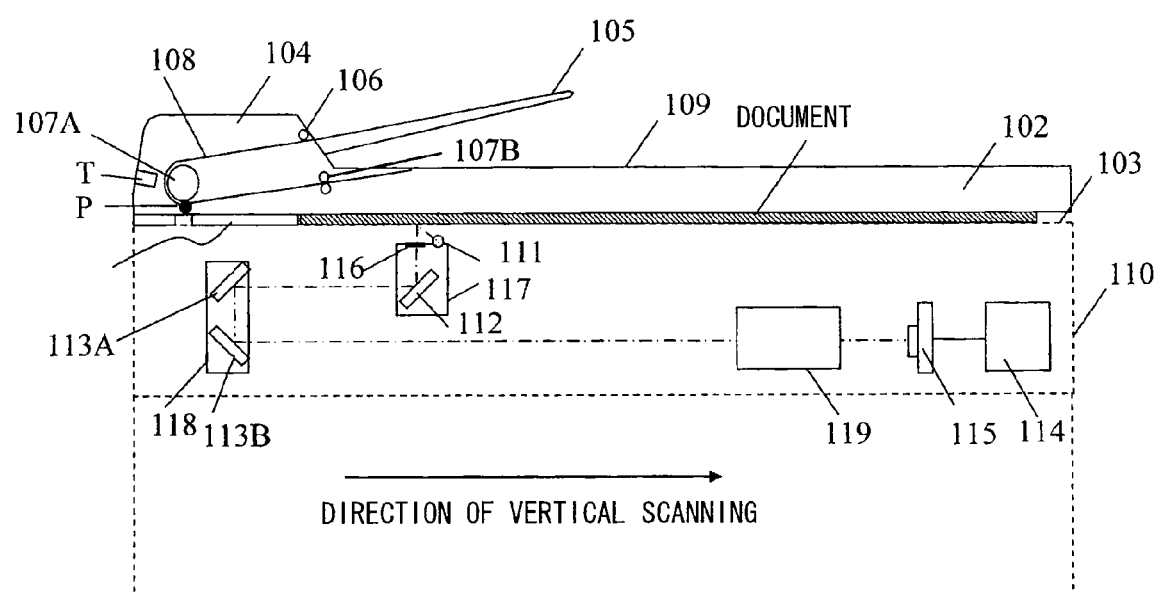
FIG. 2 is a view illustrating a configuration of a reading unit of the image reading apparatus in accordance with the first preferred embodiment of the present invention.

The reading unit 110 is disposed under the document board 103. FIG. 2 is a view illustrating a configuration of the reading unit 110. The reading unit 110 includes a first movable carriage 117, a second movable carriage 118, a group of lenses 119, an imaging element 115, and an image data generating unit 114. The first movable carriage 117 includes a light source 111, a slit 116 and a mirror 112. The light source 111 irradiates the document board 103 and is long in the direction of horizontal scanning. The slit 116 makes the light from the document board 103 pass through selectively. The mirror 112 reflects the light from the document board 103. The second movable carriage 118 includes mirrors 113A and 113B that reflect the light from the first movable carriage 117. The group of lenses 119 collects the light from the mirror. The imaging element 115 receives the light that is collected by the group of lenses 119. The image data generating unit 114 converts the light, which is received by the imaging element 115, to an electrical signal and performs a correction and a modification, if necessary.

The reading position P can be moved by moving the first movable carriage 117 and the second movable carriage 118 in the direction of vertical scanning.

When reading the document on the auto document feed apparatus 104, the light source 111 moves to the position, where the light source 111 can irradiate the reading position P, and emits the light. The light, which has been emitted from the light source 111, passes through the document board 103 and is reflected by the document that passes through the reading position P. The reflected light passes through the slit 116, the mirrors 112, 113A and 113B, and the group of lenses 119, and is received by the imaging element 115. The imaging element 115 converts the received light to the electrical signal and outputs the electrical signal to the image data generating unit 114. The light, which is received by the imaging element 115, is input to the image data generating unit 114 as an analog signal having R (red), G (green) and B (blue). The image data generating unit 114 performs an analog-digital conversion of the electrical signal and generates a digital signal. The digital signals, which are converted in series, are packed in a unit data. The image data generating unit 114 generates image data that include a plurality of unit data by correcting and modifying the unit data.

The reading unit 110 can read both the document, which is transmitted by the auto document feed apparatus 104, and the document, which is set on the document board 103. When reading the document that is set on the document board 103, the first movable carriage 117 moves in the direction of vertical scanning, emitting the light from the light source 111. The second movable carriage 118 moves to the imaging element 115 at a half speed of the first movable carriage 117 so as to keep the length of the light-path from the light source 111 to the imaging element 115.

The imaging element 115 receives the light that is reflected by the document, which is set on the document board 103, and passes through the mirrors 112, 113A and 113B. Then the imaging element 115 converts the received light to the electrical signal. The image data generating unit 114 generates the image data based on the electrical signal.

A printing unit 120 that prints the image data is disposed under the reading unit of the main body 101. The printing unit 120 can print the image data, which is generated by the image data generating unit 114, and the image data, which is received by the image forming apparatus 100 through a network interface from a terminal such as a personal computer that is connected with the image forming apparatus 100 and a network such as a LAN.

The printing unit 120 performs a printing by a xerography. The xerography will be described. First, a photoconductor drum 121 is charged uniformly by a charging unit 122. Then, the laser 123 irradiates the photoconductor drum 121, and a latent image is formed on the photoconductor drum 121. A developing unit 124 attaches toner to the latent image and generates a visible image. The visible image is printed on a paper by a transfer roller.

When the printing unit 120 performs printing, a pickup roller 135 picks up a piece of paper from one of paper feed trays 132, 133 and 134. Then the picked-up paper is transmitted between an intermediate transfer belt 125A and a transfer roller 125B by a feed roller 137 and a resist roller 138. A piece of paper, which is set on a manual paper feed tray 131, may be picked up by a pickup roller 136. The pickup roller 136 is disposed for the manual paper feed tray 131.

In the printing unit 120, the paper is transmitted to an anchorage device 127 by a feed belt 126, so that the visible image on the intermediate transfer belt 125A can be printed and fixed on the paper that has been transmitted between the intermediate transfer belt 125A and the transfer roller 125B. The anchorage device 127 includes a heating roller 128 that includes a heater inside and a pressure roller 129 that is pushed to the heating roller 128 at a predetermined pressure. If the paper is transmitted between the heating roller 128 and the pressure roller 129, then the visible image is fixed on the paper by the heat and by the pressure being pushed on the paper. The printing unit 120 transmits the paper, which has passed through the anchorage device 127, to a receiving tray 130.

The process of the basic copy function of the multifunction printer 100 in accordance with the first preferred embodiment of the present invention was described. The multifunction printer 100 provides other functions such as a facsimile transmission and reception function, a printing function, a scanning function, a post-processing function, and a memory function to a user by operating the above-mentioned units (the reading unit 110 and the printing unit 120) cooperatively.

Figure 3:
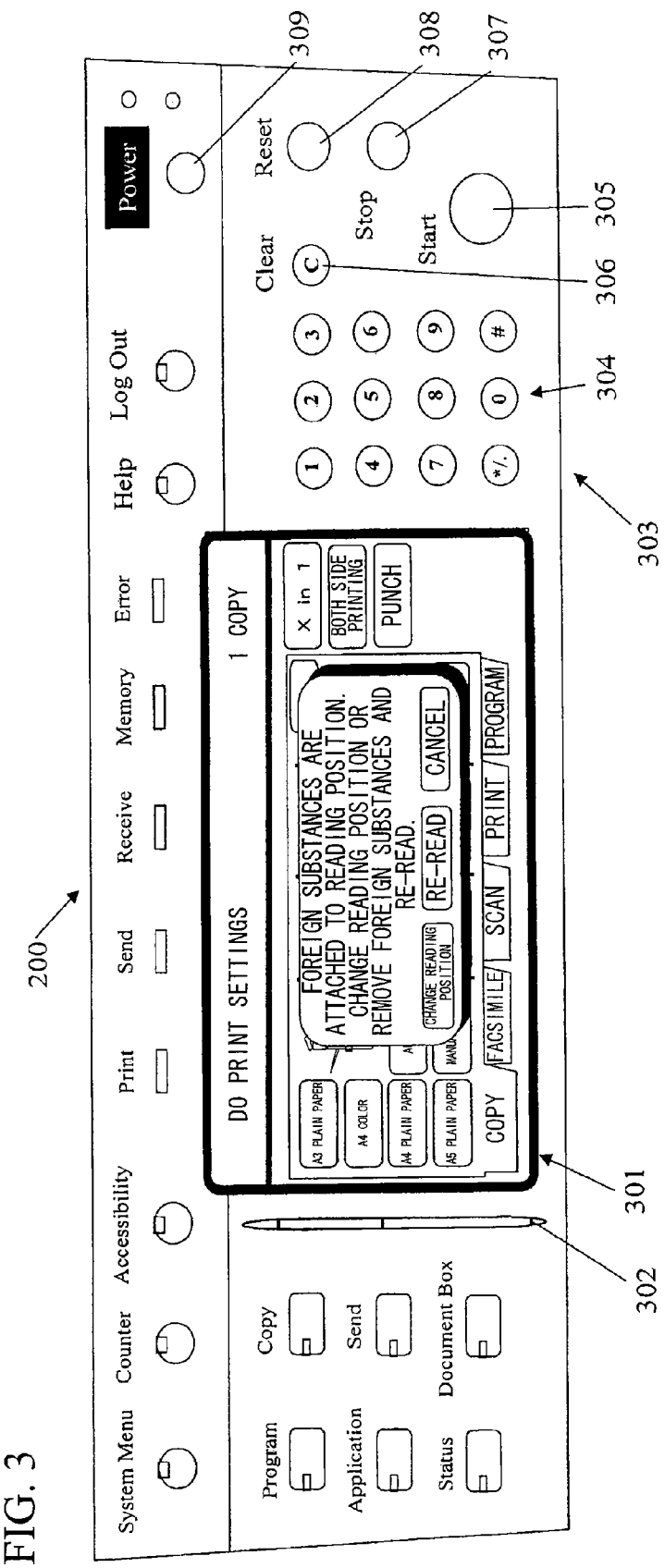
FIG. 3 is a view illustrating a configuration of an operation unit of the image reading apparatus in accordance with the first preferred embodiment of the present invention.

FIG. 3 is a view illustrating a configuration of the operation unit 200 of the multifunction printer 100 in accordance with the first preferred embodiment of the present invention. A user inputs various setting of the functions of the multifunction printer 100 by using the operation unit 200. A touch panel 301, a touch pen 302 and an operation key 303, which are disposed on the operation unit 200, are used when operating an input of a setting condition, a start of various functions, various settings, and a change of settings. The operation key 303 may include ten keys 304, a start bottom 305, a clear bottom 306, a stop bottom 307, a reset bottom 308, and a power bottom 309. If a setting item displayed in a screen (an initial screen, for example) in the touch panel 301 is pushed, then a setting screen associated with the setting item is displayed and setting conditions are input.

The touch panel 301 has a function to input setting conditions and a function to display the setting conditions, which corresponds to the functions of the display panel. If the item or the icon in the setting screen displayed in the touch panel 301 is pushed, then the setting condition associated with the item or the icon is input.

The touch pen 302 is set near the touch panel 301. If an end of the touch pen 302 is touched to the touch panel 301 by a user, then a sensor disposed under the touch panel 301 detects a touched position of the touch panel 301. When touched by the touch pen 302, keys in the keyboard screen are pushed and predetermined handwritten information is input. The predetermined handwritten information is converted to a predetermined character in series. Background color of the item or the icon is changed from white to gray, which is associated with the input setting conditions. The input setting conditions are confirmed by the background color.

Figure 4:
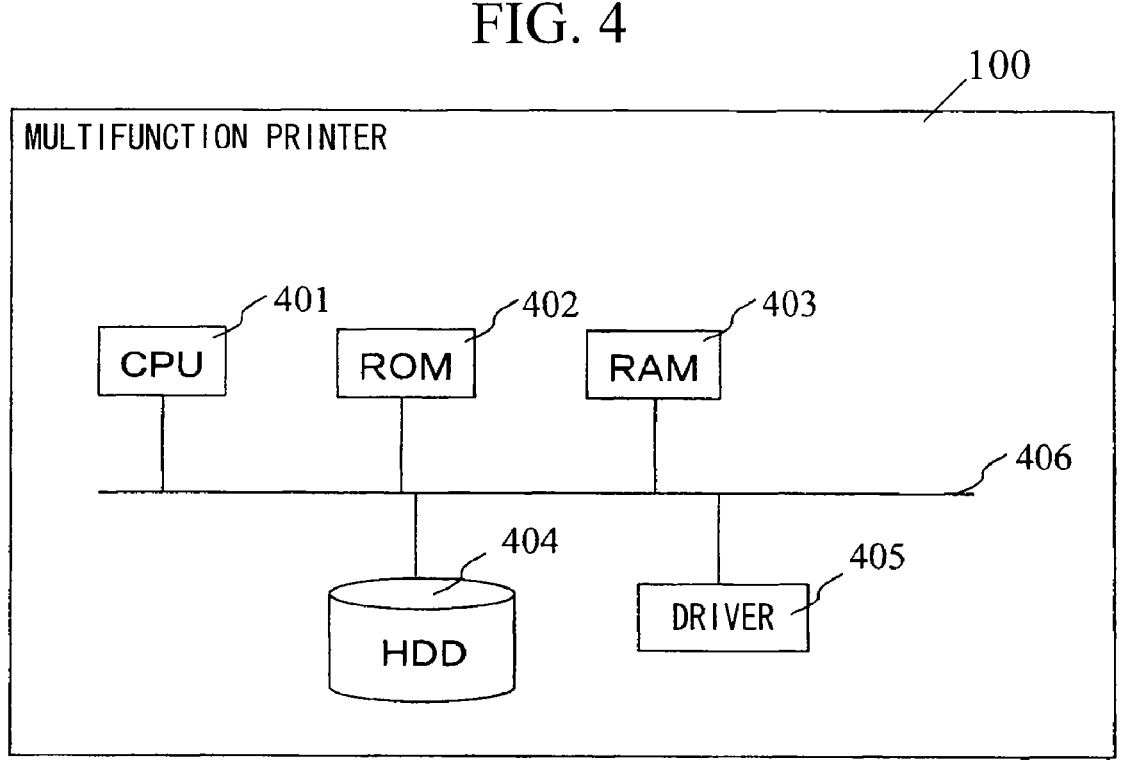
FIG. 4 is a view illustrating a configuration of a hardware control system of the image forming apparatus that includes the image reading apparatus in accordance with the first preferred embodiment of the present invention.

Next, a configuration of a hardware control system of the multifunction printer 100 will be described. FIG. 4 is a view illustrating the configuration of the hardware control system of the multifunction printer 100 in accordance with the first preferred embodiment of the present invention. Details of each unit, which are not related to the present invention, are omitted in the figure.

Figure 5:
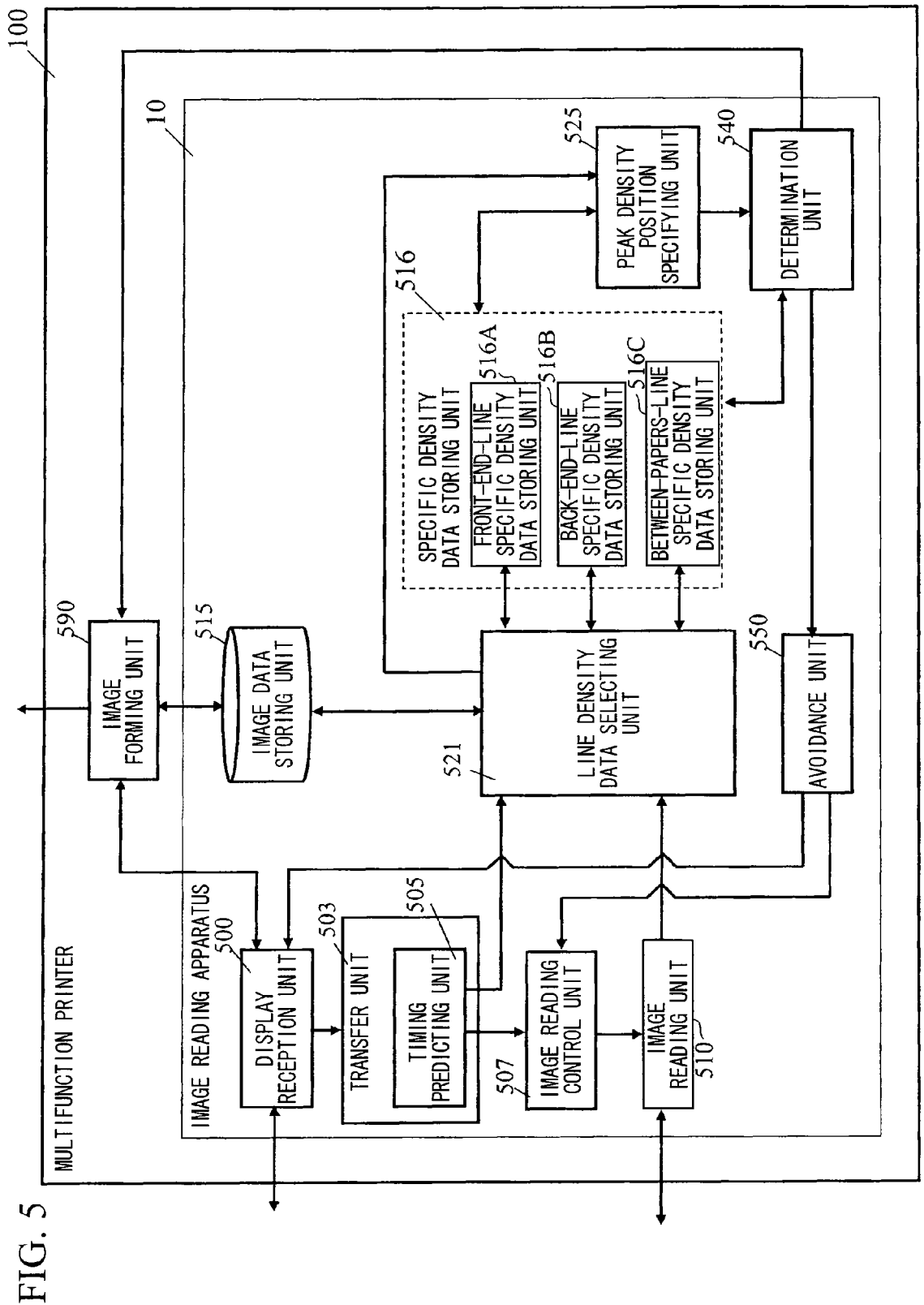
FIG. 5 is a block diagram illustrating functions of the image reading apparatus and the image forming apparatus in accordance with the first preferred embodiment of the present invention.

The multifunction 100 may include a CPU (Central Processing Unit) 401, a ROM (Read Only Memory) 402, a RAM (Random Access Memory) 403, a HDD (Hard Disk Drive) 404, a driver 405 corresponding to each drive unit, and an internal bus 406. The internal bus 406 connects the CPU 401, the ROM 402, the RAM 403, the HDD 404 and the driver 405. The CPU 401 uses the RAM 403 as a work area. The CPU 401 executes a program stored in the ROM 402, the HDD 404, and so on. The CPU 401 receives data and instructions from the driver 405 and the operation unit 200, based on the result of execution. The CPU 401 controls the operation of each drive unit as illustrated in FIG. 1 and FIG. 2. By executing the program, the CPU 401 realizes each unit, which is illustrated in FIG. 5, other than the drive unit. The program and data that realize each unit, which will be described below, are stored in the ROM 402 and the HDD 404.

Figure 6:
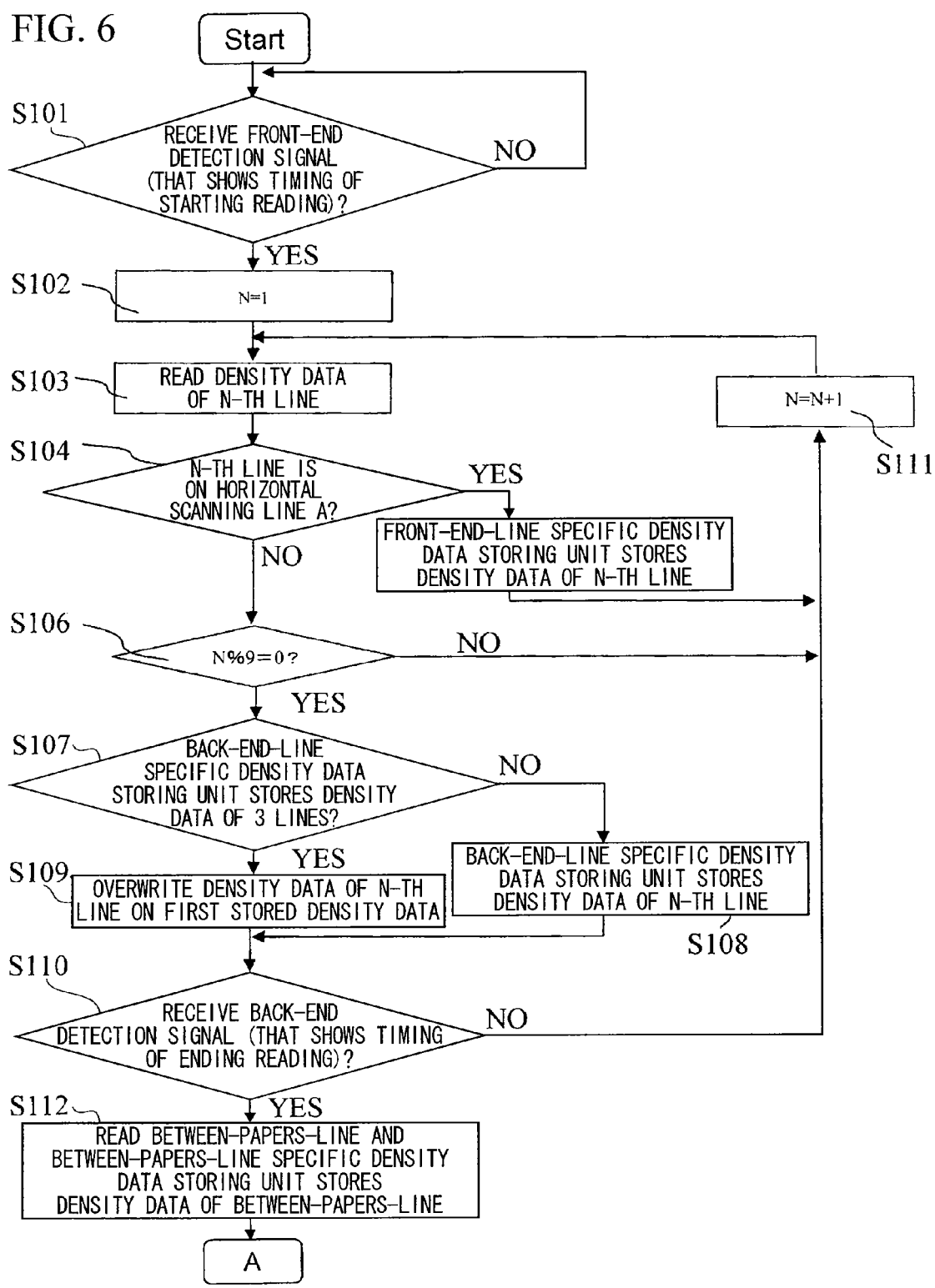
FIG. 6 is a flow chart illustrating a process of detecting a black line in the image reading apparatus in accordance with the first preferred embodiment of the present invention.
Figure 7:
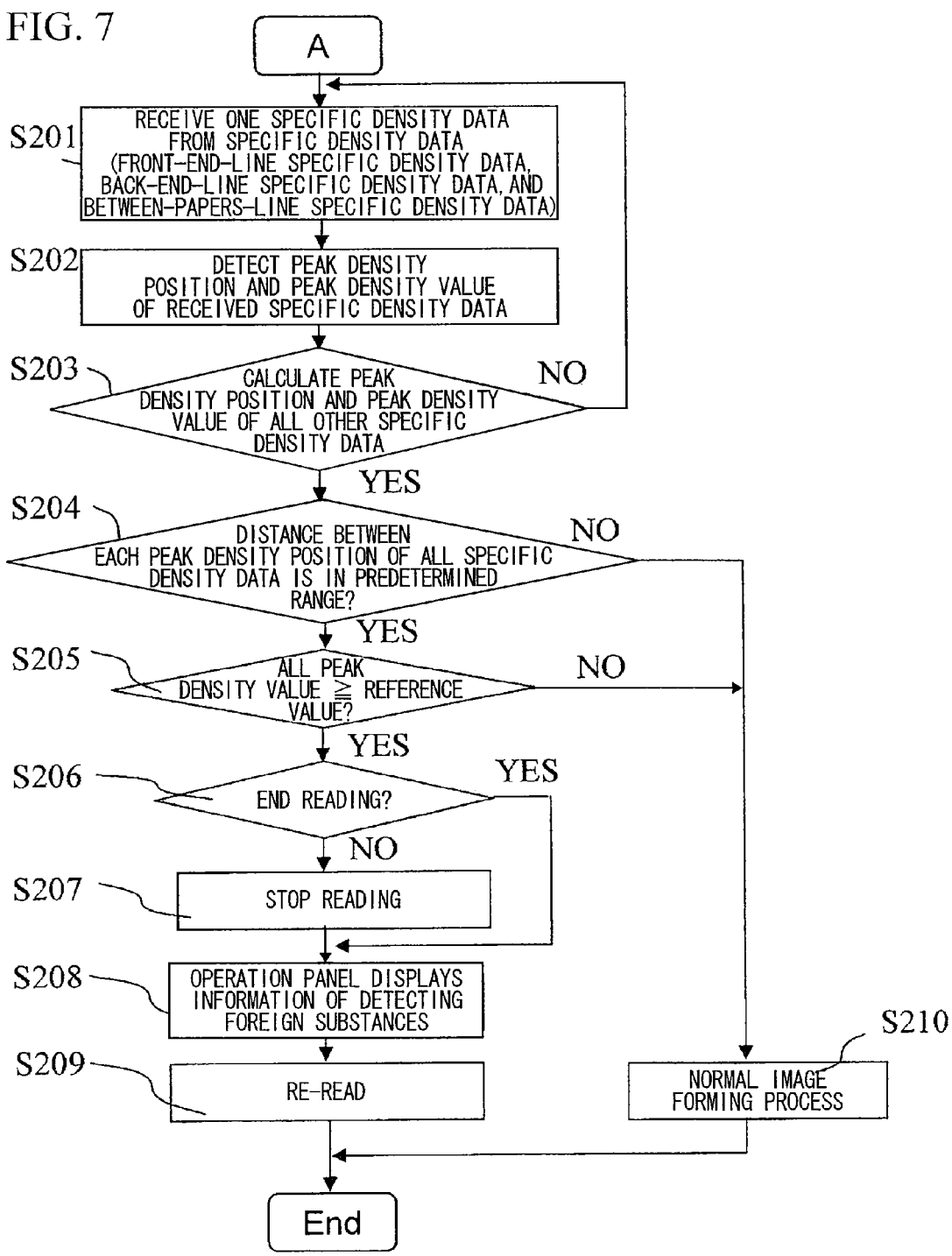
FIG. 7 is a flow chart illustrating a process of detecting a black line in the image reading apparatus in accordance with the first preferred embodiment of the present invention.
Figure 10:
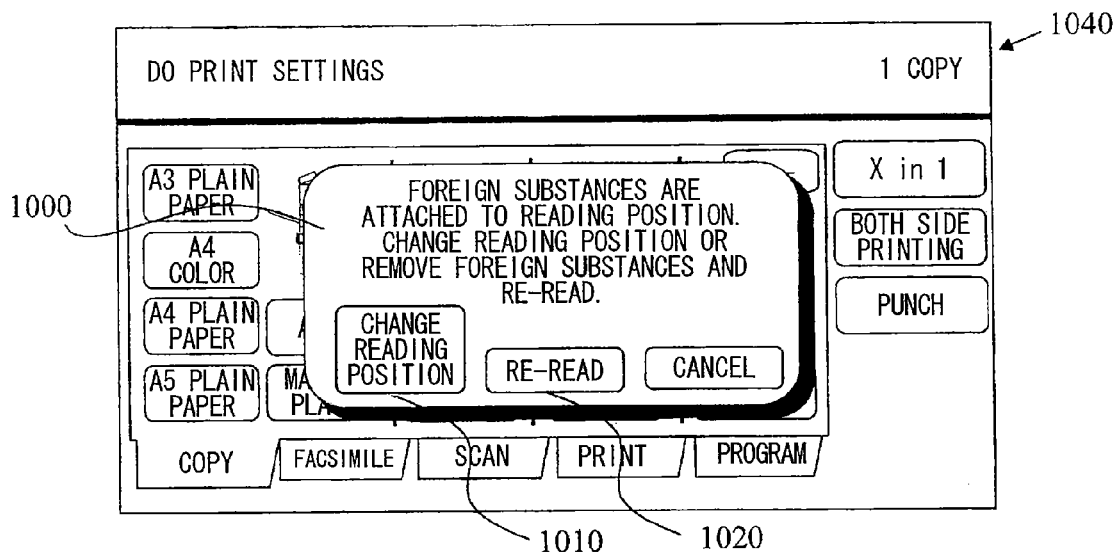
FIG. 10 is a view illustrating a screen of the operation unit of FIG. 3.

Next, a process of detecting a black line by an image reading apparatus 10 in accordance with the first preferred embodiment of the present invention will be described using FIG. 5, . . . , FIG. 10. FIG. 5 is a block diagram illustrating functions of the multifunction printer 100 including the image reading apparatus 10 in accordance with the first preferred embodiment of the present invention. FIG. 6 and FIG. 7 are flow charts illustrating a process of detecting the black line by the multifunction printer 100 in accordance with the first preferred embodiment of the present invention.

The multifunction printer 100 may include the image reading apparatus 10 and an image forming unit 590. The image reading apparatus 10 may include a display reception unit 500, a transfer unit 503, an image reading control unit 507, an image reading unit 510, an image data storing unit 515, a specific density data storing unit 516, a line density data selecting unit 521, a peak density position specifying unit 525, a determination unit 540, and an avoidance unit 550. The transfer unit 503 may include a timing predicting unit 505. The specific density data storing unit 516 may include a front-end line specific density data storing unit 516A, a back-end line specific density data storing unit 516B, and a line between documents specific density data storing unit 516C.

If a document is set on the auto document feed apparatus 104 by a user and a setting condition is input, then the display reception unit 500 receives the setting condition. If the start key 305 of the operation unit 200 is pushed by a user, then the transfer unit 503 transfers the document in series.

If the document is transferred by the transfer unit 503, then the timing predicting unit 505 detects an end of the document, which has been transferred, and predicts a read-start-timing (a timing when the end of the document reaches the reading position) that starts reading of the document. For example, the timing predicting unit 505 detects the end of the document by the sensor disposed on the document feed path 108 in the transfer unit 503, and predicts the read-start-timing based on the position of the sensor, the distance between the position of the sensor and the reading position P, and the transfer speed at which the transfer unit 503 transfers the document.

The timing predicting unit 505 transmits an end detection signal to the image reading control unit 507 based on the read-start-timing that is predicted.

If the timing predicting unit 505 transmits the end detection signal to the image reading control unit 507, then the image reading control unit 507 receives the end detection signal (S101 of FIG. 6), and controls the image reading unit 510 to start reading a first horizontal scanning line of the document (S102 and S103 of FIG. 6) and to read the image data in each horizontal scanning line from the front-end of the document.

If the image reading unit 510 reads the image data of the horizontal scanning line, then the line density data selecting unit 521 receives the image data to store in the image data storing unit 515. The image data is stored as density data (data of the density value at each pixel of each horizontal scanning line). For example, the density data of one horizontal scanning line includes data of pixels, each of which is represented by 256 gradations (0: white, 255: black). The image data storing unit 515 stores the density data by the unit of one document.

Figure 8:
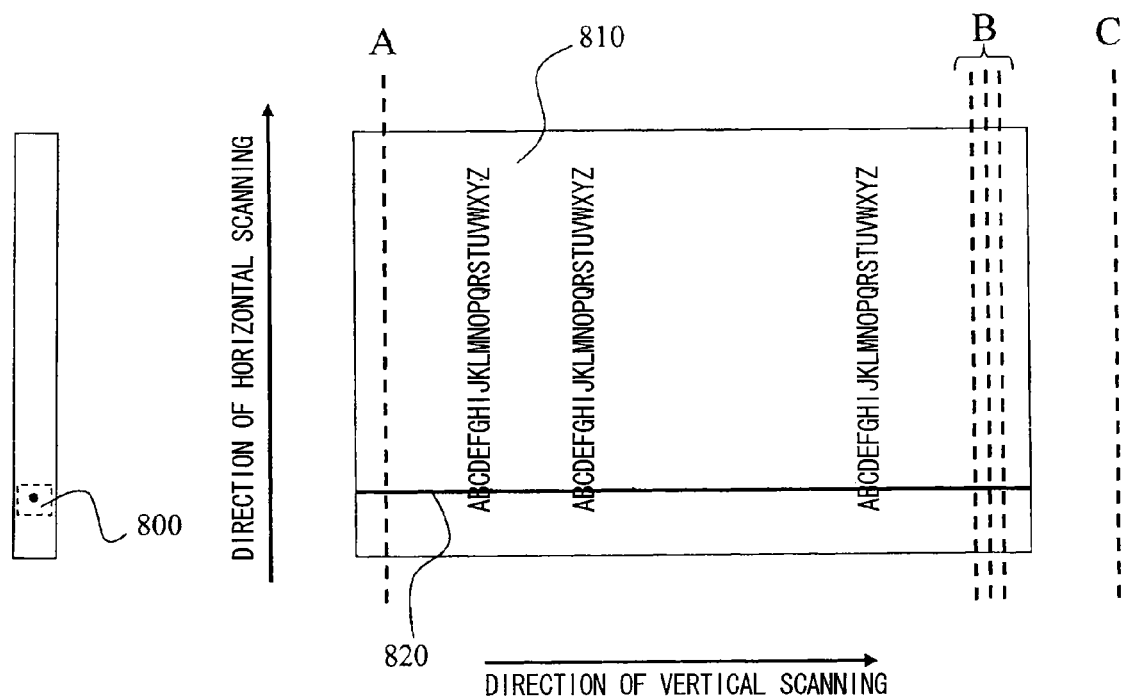
FIG. 8 is a view illustrating a relationship between image data and the block line in accordance with the first preferred embodiment of the present invention.

If the line density data selecting unit 521 receives the image data (which will be hereinafter described as the density data) of each horizontal scanning line of the document that is read by the image reading unit 510, then the line density data selecting unit 521 sorts data of a horizontal scanning line A, a horizontal scanning line B, and a horizontal scanning line C that are illustrated in FIG. 8, the density data being stored in the image data storing unit 515. The horizontal scanning line A, the horizontal scanning line B, and the horizontal scanning line C will be described below. The data of the horizontal scanning line C (a line between documents density data, which will be described) is not stored in the image data storing unit 515.

The horizontal scanning line A is a front-end line that is predetermined lines after the front-end of the document in the direction of document feed. The horizontal scanning line C is a line between documents that is in an area between one document and next transmitted document. The density data of a white sheet (a sheet disposed on the platen cover 102) is detected in the area through the contact glass. The horizontal scanning line B is a back-end line that is the horizontal scanning line of the document, which is read by the image reading unit 510, corresponding to the density data being stored in the back-end line density specific data storing unit 516B, which will be described below. The direction that the document is transmitted is defined as the forward of the document. That is, the document is read from the forward of the document to the backward of the document.

In the first preferred embodiment of the present invention, the horizontal scanning line A is 6 mm after the front-end of the document in the direction of document feed. In general, the area of 6 mm after the front-end of the document is the area of a white paper where the document image does not exist. If the density data other than white is read in the horizontal scanning line A, it is highly possible that a foreign substance 800 (or a dust) illustrated in FIG. 8 is attached.

The line density data selecting unit 521 determines whether or not each horizontal scanning line of the received density data is the horizontal scanning line A (S104 of FIG. 6).

If the horizontal scanning line of the received density data is the horizontal scanning line A, then the front-end line density specific data storing unit 516A stores the density data (the front-end line density data), which is controlled by the line density data selecting unit 521 ("Yes" in S104 and S105 of FIG. 6).

If the horizontal scanning line of the received density data is not the horizontal scanning line A, then the line density data selecting unit 521 determines each density data of a predetermined number of the horizontal scanning lines as the back-end line density data ("No" in S104 and S106 of FIG. 6). The back-end line density specific data storing unit 516B stores the back-end line density data, which is controlled by the line density data selecting unit 521 ("No" in S107 and S108 of FIG. 6).

The back-end line density specific data storing unit 516B stores the density data of the predetermined number of (a plurality of) the horizontal scanning lines. If the back-end line density specific data storing unit 516B has stored the density data of the predetermined number of the horizontal scanning lines, the back-end line density specific data storing unit 516B overwrites and stores new density data of newly selected horizontal scanning lines, replacing old density data of the first stored horizontal scanning lines, which is controlled by the line density data selecting unit 521 ("Yes" in S107 and S109 of FIG. 6).

In the first preferred embodiment, the line density data selecting unit 521 selects the density data of each 9 horizontal scanning lines as the back-end line density data, so that the distance between the selected horizontal scanning lines becomes 8 lines. In the first preferred embodiment, the back-end line density specific data storing unit 516B stores the density data of 3 horizontal scanning lines, which have been selected by the line density data selecting unit 521. "N%9" in S106 of FIG. 6 means the remainder when N is divided by 9, and S106 shows selecting of each 9 horizontal scanning lines. The number of the horizontal scanning lines, of which the line density data selecting unit 521 selects the density, is not limited to 8, but may be an arbitrary number. The number of the horizontal scanning lines, of which the back-end line density specific data storing unit 516B stores the density data, is not limited to 3, but may be an arbitrary number.

Next, if the timing predicting unit 505 detects the back-end line of the document, then the timing predicting unit 505 predicts a timing to finish reading of the document, and outputs a back-end detection signal to the line density data selecting unit 521 and the image reading control unit 507 based on the timing to finish reading.

The line density data selecting unit 521 makes the back-end line density specific data storing unit 516B store the selected density data (the back-end line density data) until the timing predicting unit 505 outputs the back-end detection signal to the line density data selecting unit 521 and the line density data selecting unit 521 receives the back-end detection signal ("No" in S110, S111, and S103 of FIG. 6).

Therefore, at the timing of finishing reading of the document (at the timing), the back-end line density specific data storing unit 516B stores the density data of the predetermined numbers of horizontal scanning lines (3 horizontal scanning lines, in this embodiment) including the latest density data and the density data of the predetermined lines before.

If the reading position at detecting the back-end detection signal is slipped from the back-end position because the timing that the timing predicting unit 505 had predicted is slipped, then the density data of the latest line, which is one of the plurality of density data stored in the back-end line specific density data storing unit 516B, may be the line between documents density data. By adjusting the number of lines that the line density data selecting unit selects based on the number of back-end lines that is slipped, more than one of the density data stored in the back-end line specific density data storing unit 516B can be the back-end density data. Therefore, the plurality of the density data can be used as a criterion that determines whether or not the foreign substance is attached to the reading position, which will be described below.

The number of back-end lines that is slipped is normally about 10. By storing the density data of 3 lines in each 9 lines, more than one of the density data of the 3 lines become the back-end line density data, as in the first preferred embodiment.

If the timing predicting unit 505 outputs the back-end detection signal to the image reading control unit 507, then the image reading control unit 507 receives the back-end detection signal ("Yes" in S110 of FIG. 6), and controls the image reading unit 510 to read the line between documents.

Then the line density data selecting unit 521 receives the density data of the line between documents that is read last by the image reading unit 510. The density data that is received is the density data of the line between documents (the line between documents density data) between the document and the next document (the area where there is no document). The line density data selecting unit 521 makes the line between documents specific density data storing unit 516C store the density data (S112 of FIG. 6).

The front-end line density data, the back-end line density data and the line between documents density data that are stored in the specific density data storing unit 516 (the front-end line specific density data storing unit 516A, the back-end line specific density data storing unit 516B and the line between documents specific density data storing unit 516C) are referred to as specific density data. The back-end line density data is the density data of 3 lines from the latest density data to the density data of 2 lines before, which are stored in the back-end line specific density data storing unit 516B at the timing when the back-end detection signal is received (at the timing of finishing reading).

Figure 9:
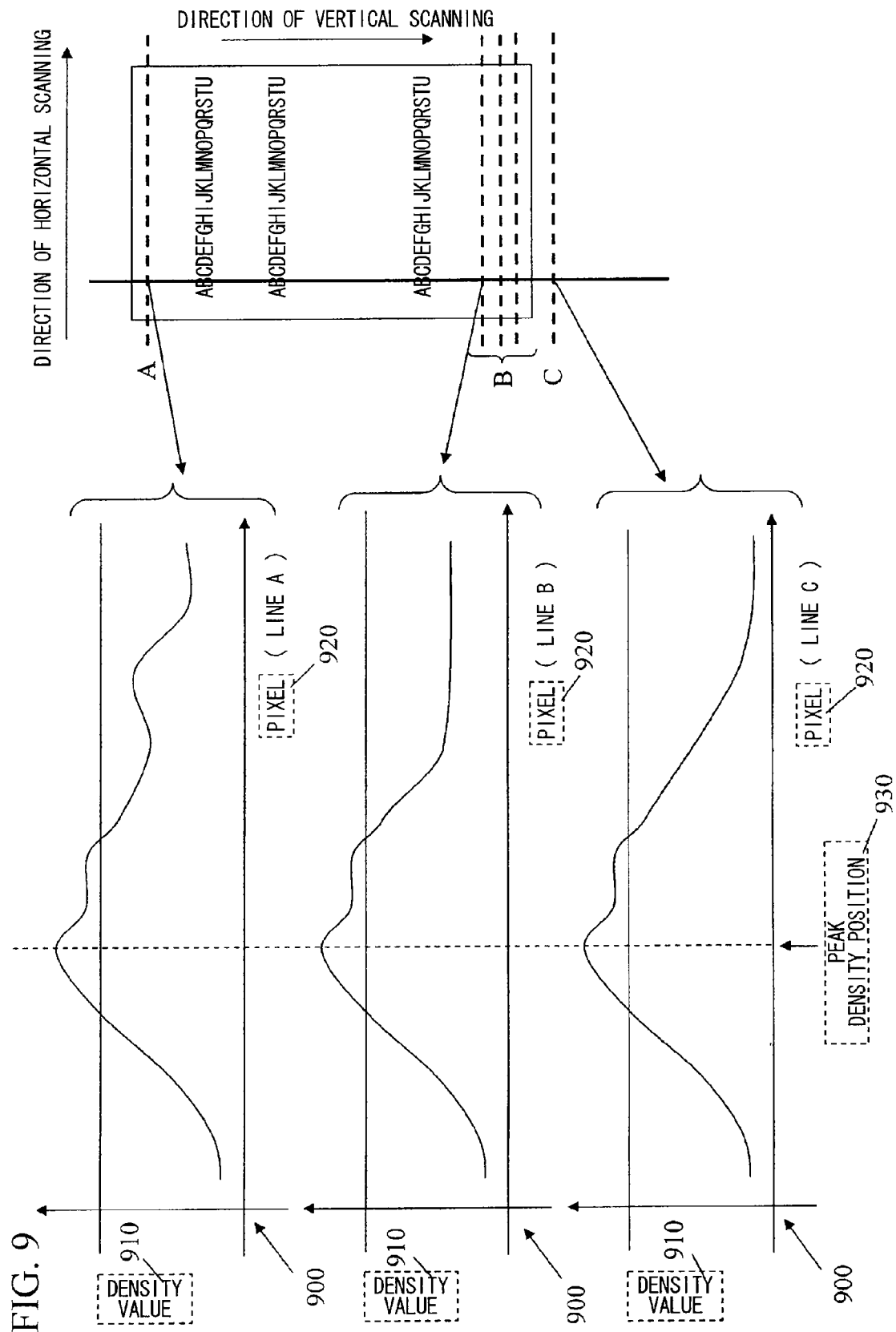
FIG. 9 is a view illustrating a relationship between the image data and density data in accordance with the first preferred embodiment of the present invention.

FIG. 9 is a specific density data graph 900 illustrating the specific density data corresponding to each horizontal scanning line. The horizontal axis represents pixels 920 corresponding to the coordinate in the direction of the horizontal scanning line. The vertical axis represents the density data 910 corresponding to the pixels 920. In the back-end line (the line B), the specific density data of 3 lines are acquired, but 2 lines are omitted in the graph.

If the line density data selecting unit 521 makes the specific density data stored in the specific density data storing unit 516, then the line density data selecting unit 521 reports to the peak density position specifying unit 525 that the specific density data is stored in the specific density data storing unit 516.

Then the peak density position specifying unit 525 receives one of the specific density data from each specific density data storing unit 516 (S201 of FIG. 7). The peak density position specifying unit 525 detects increase and decrease of the density value of the specific density data. As a result, the peak density position specifying unit 525 detects the peak-density position (the position of pixel which density is more than the predetermined density) and the density value of the pixel (the peak-density value) corresponding to the peak-density position (S201 of FIG. 7). The peak-density position may be more than one. The peak-density position may be the position of the pixel which density value is the highest of the specific density data.

The peak density position specifying unit 525 makes the specific density data storing unit 516 store the specific density data corresponding to each line, related to the peak-density position and the peak-density value that are detected. The peak density position specifying unit 525 repeats the above operation till the peak density position specifying unit 525 detects the peak-density position and the corresponding peak-density value of all specific density data ("No" in S203 and S201 of FIG. 7).

In the first preferred embodiment, the peak density position specifying unit 525 detects the peak-density position 930 (the position of the pixel), corresponding to the peak of the density data graph 900, and the peak-density value (the density value of the peak-density position 930), which are illustrated in FIG. 9.

If the peak density position specifying unit 525 detects all peak-density value corresponding to the peak-density position of 5 lines ("Yes" in S203 of FIG. 7) and makes the specific density data storing unit 516 store the specific density data corresponding to the 5 lines, related to the peak-density position and the peak-density value that are detected, then the peak density position specifying unit 525 reports to the determination unit 540 that the peak density position specifying unit 525 detects the peak-density position and the peak-density value of the specific density data.

Then the determination unit 540 receives the peak-density position and the peak-density value corresponding to each specific density data from the specific density data storing unit 516, and determines whether or not the difference of the distance between the acquired peak-density positions of each line is in a predetermined range (S204 of FIG. 7).

If the difference of the distance between the acquired peak-density positions of each line is in a predetermined range, then the determination unit 540 compares the peak-density value of each specific density data received from the specific density data storing unit 516 with the predetermined standard value, and determines whether or not each peak-density value is more than the predetermined standard value (S205 of FIG. 7). Here, the standard value is the density data that becomes the standard (threshold) when determining the black line, and is the specific density value that is predetermined in 256 shades of gray.

If the difference of the distance between the acquired peak-density positions of each line is not in a predetermined range or one of the peak-density value is less than the standard value, then the determination unit 540 determines that there is no black line in the image data of the document, and normal image forming process is performed without the process described below ("No" in S204 or "No" in S205 and S210 of FIG. 7).

If all peak-density values are more than the above standard value ("Yes" in S205 of FIG. 7), then the determination unit 540 determines that there is the black line in the image data, and reports to the avoidance unit 550 that there is the black line.

If the image forming unit 590 performs an output operation of the image data, then the determination unit 540 orders the image forming unit 590 to stop the output operation of the image data. Then the image forming unit 590 can stop the output operation.

When the determination unit 540 reports to the avoidance unit 550 that there is the black line, if the image reading unit 510 performs a reading operation of the image data, the avoidance unit 550 orders the image reading unit 510 to stop the image reading operation. Then the image reading control unit 506 controls the image reading unit 510 to stop the image reading operation ("Yes" in S206 and S207 of FIG. 7).

The avoidance unit 550 orders to the display reception unit 500 to display a screen instructing a user to select the method of avoiding reading of the foreign substance, which causes the black line.

Then the display reception unit 500 makes a foreign substance confirmation screen 1000 pop up in an initial screen 1040. The foreign substance confirmation screen 1000 displays the screen informing that the foreign substance is attached to the reading position and instructing a user to select the method to avoid reading of the foreign substance. One method is to read again with changing the reading position. Another method is to read again after removing the foreign substance.

In order to read again with changing the reading position after the display of the foreign substance confirmation screen 1000, a user pushes an item 1010 for changing reading position. Then the avoidance unit 550 orders the image reading control unit 507 to change the reading position and reading again the document. Then the image reading control unit 507 controls the image reading unit 510 to move the reading position for a predetermined distance in the direction of vertical scanning and to read again (S209 and "END" of FIG. 7). In order to read again after removing the foreign substance after the display of the foreign substance confirmation screen 1000, a user removes the foreign substance and pushes an item 1020 for reading again. Then the image reading unit 510 starts reading again.

In another configuration, either deleting the black line or changing the reading position may be selected, and if the determination unit 540 determines that the image data has the black line, then the avoidance unit 550 may automatically perform either process that is set up above.

In the first preferred embodiment, the line density data selecting unit 521 determines whether or not the horizontal scanning line read by the image reading unit 510 is at the position of the front-end line, and if the horizontal scanning line is not at the position of the front-end line (at the position of the horizontal scanning line A), then the density data of the back-end line is selected. In this case, even if the N-th line that is read is before the front-end line, the density data of the line is selected as the back-end line density data. On the other hand, if the horizontal scanning line that is read is over the front-end line, the back-end line density data may be selected.

Figure 11:
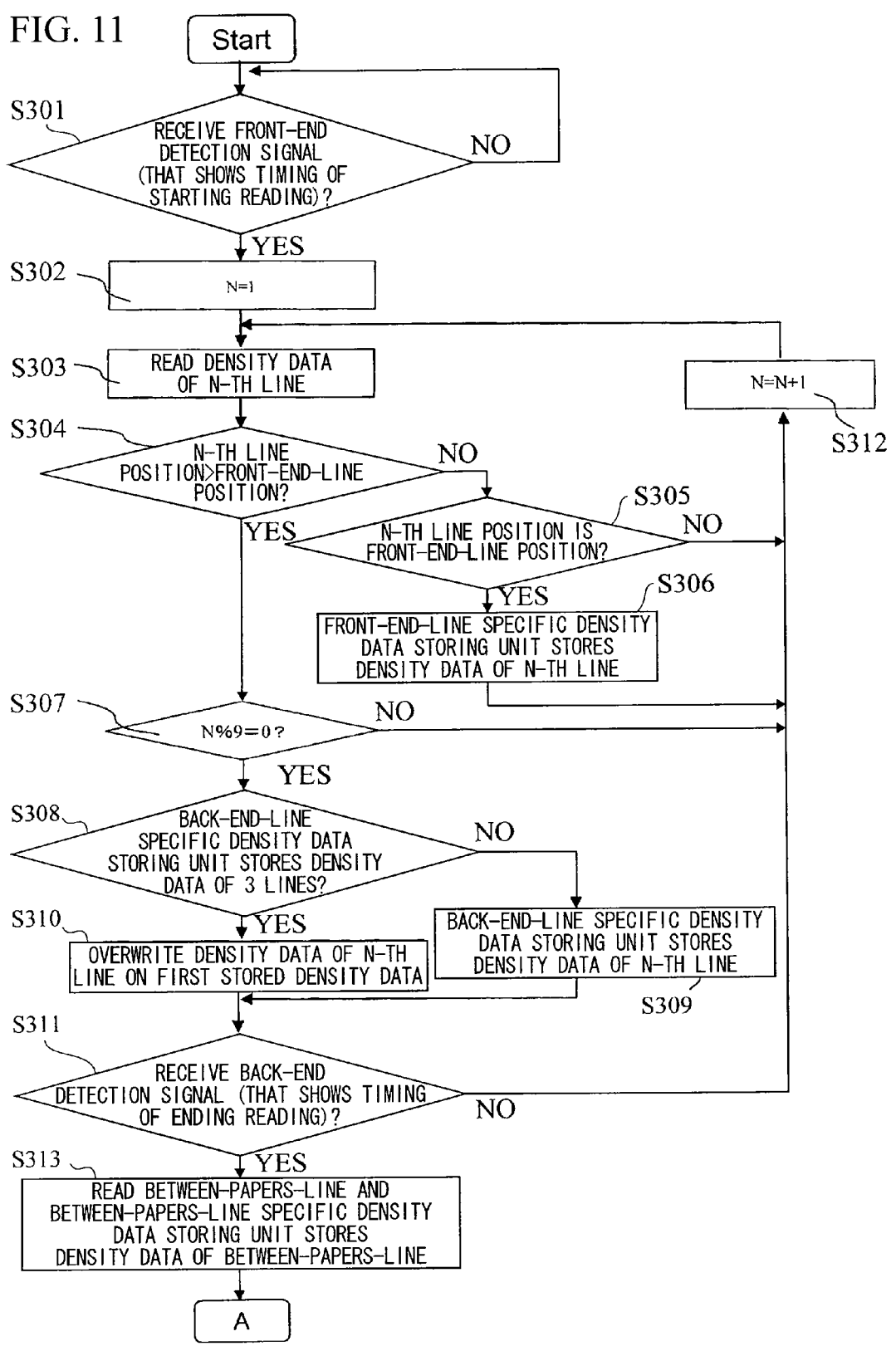
FIG. 11 is a flow chart illustrating a process of detecting a black line in the image reading apparatus in accordance with the first preferred embodiment of the present invention.

For example, the line density data selecting unit 521 determines whether or not the N-th line that is read is over the front-end line, as illustrated in FIG. 11. If the N-th line that is read is over the front-end line, then the density data of the back-end line is acquired ("Yes" in S304 and S307 of FIG. 11). The other step is equal to the above preferred embodiment, and the description is omitted.

In the first preferred embodiment, the determination unit 540 determines whether or not the difference of the distance between each peak-density positions is in the predetermined range, and then determines whether or not the peak-density value is over the standard value. On the other hand, the determination unit 540 may determine whether or not the peak-density value is over the standard value, and then determines whether or not the difference of the distance between each peak-density positions is in the predetermined range.

Figure 12:
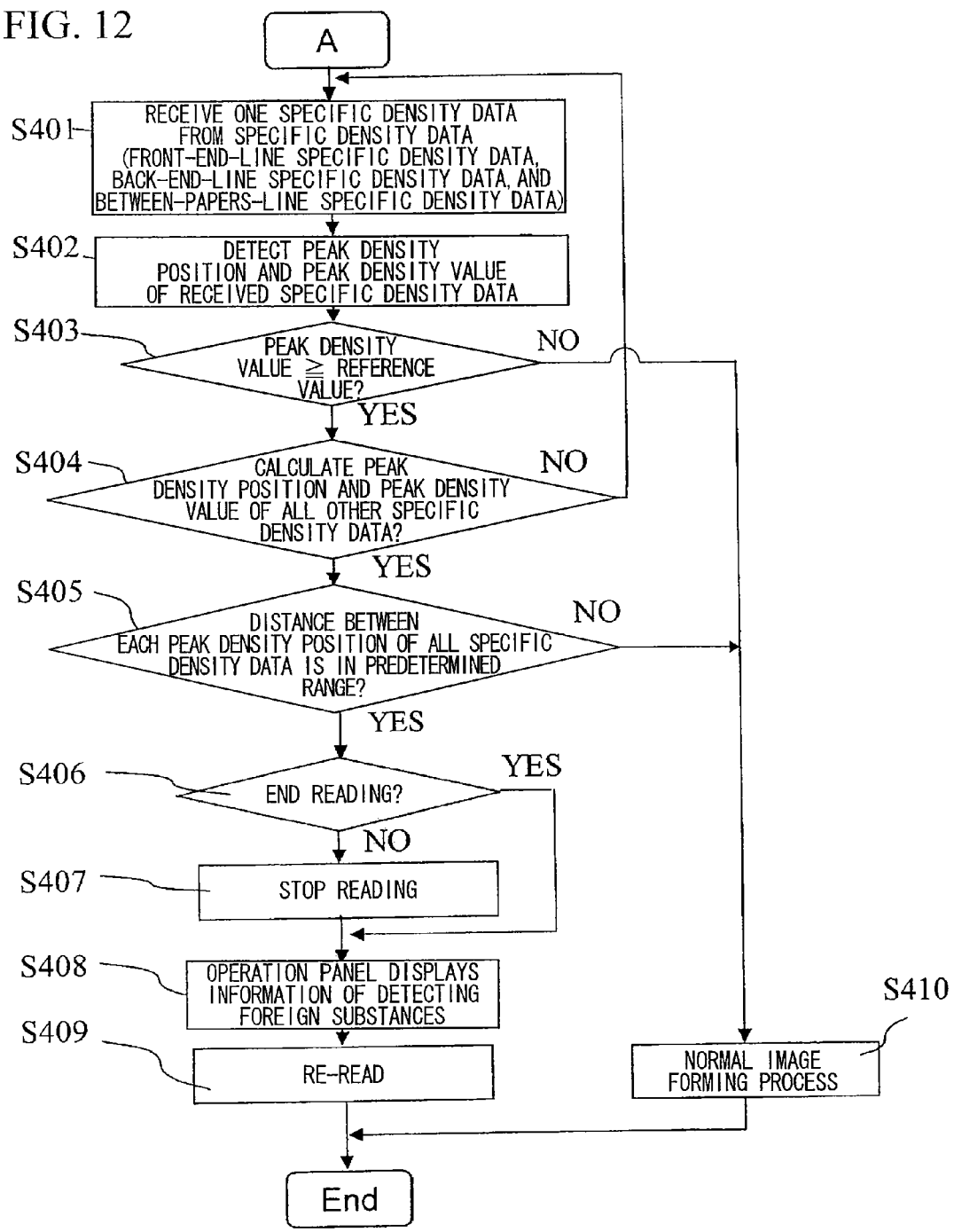
FIG. 12 is a flow chart illustrating a process of detecting a black line in the image reading apparatus in accordance with the first preferred embodiment of the present invention.

For example, the peak density position specifying unit 525 detects the peak-density position and the corresponding peak-density value of one of the specific density data, and then determines whether or not the peak-density value that is detected is over the predetermined standard value (S403 of FIG. 12).

If the peak-density value is over the standard value, then the peak-density position and the peak-density value are detected corresponding to the next specific density data ("No" in S404 of FIG. 12), and determines whether or not the peak-density value is over the standard value. Then, if the peak-density value corresponding to all specific density values is over the standard value, then it may be determined whether or not the difference of the distance between the peak-density positions that are detected is in the predetermined range ("Yes" in S404 and S405 of FIG. 12). The following step is the same as the above described embodiment, and the description is omitted.

The display reception unit 500, the transfer unit 503, the timing predicting unit 505, the image reading control unit 507, the image reading unit 510, the image data storing unit 515, the specific density data storing unit 516, the front-end line specific density data storing unit 516A, the back-end line specific density data storing unit 516B, the line between documents specific density data storing unit 516C, the line density data selecting unit 521, the peak density position specifying unit 525, the determination unit 540, the avoidance unit 550, and the image forming unit 590 are realized by the CPU 401 executing the program.

The program and the data that realize the display reception unit 500, the transfer unit 503, the timing predicting unit 505, the image reading control unit 507, the image reading unit 510, the image data storing unit 515, the specific density data storing unit 516, the front-end line specific density data storing unit 516A, the back-end line specific density data storing unit 516B, the line between documents specific density data storing unit 516C, the line density data selecting unit 521, the peak density position specifying unit 525, the determination unit 540, the avoidance unit 550, and the image forming unit 590 are stored in the ROM 402, the HDD 404, etc.

In the first preferred embodiment of the present invention, the density data is selected in each horizontal scanning line of the predetermined numbers, and the density data from the latest density data to the predetermined before the latest density data are stored as the density data of the back-end of the document. By using the image reading apparatus in accordance with the first preferred embodiment of the present invention, the determination of the black line can be performed to the slip, as the back-end of the document is transmitted before the reading position to some extent at the timing of detecting the back-end of the document. Therefore, the image reading apparatus in accordance with the first preferred embodiment of the present invention can be used as the copy machine, the printer, the scanner, the multifunction printer, etc., and is effective in determining whether or not there is the black line.

Second Embodiment

Figure 13:
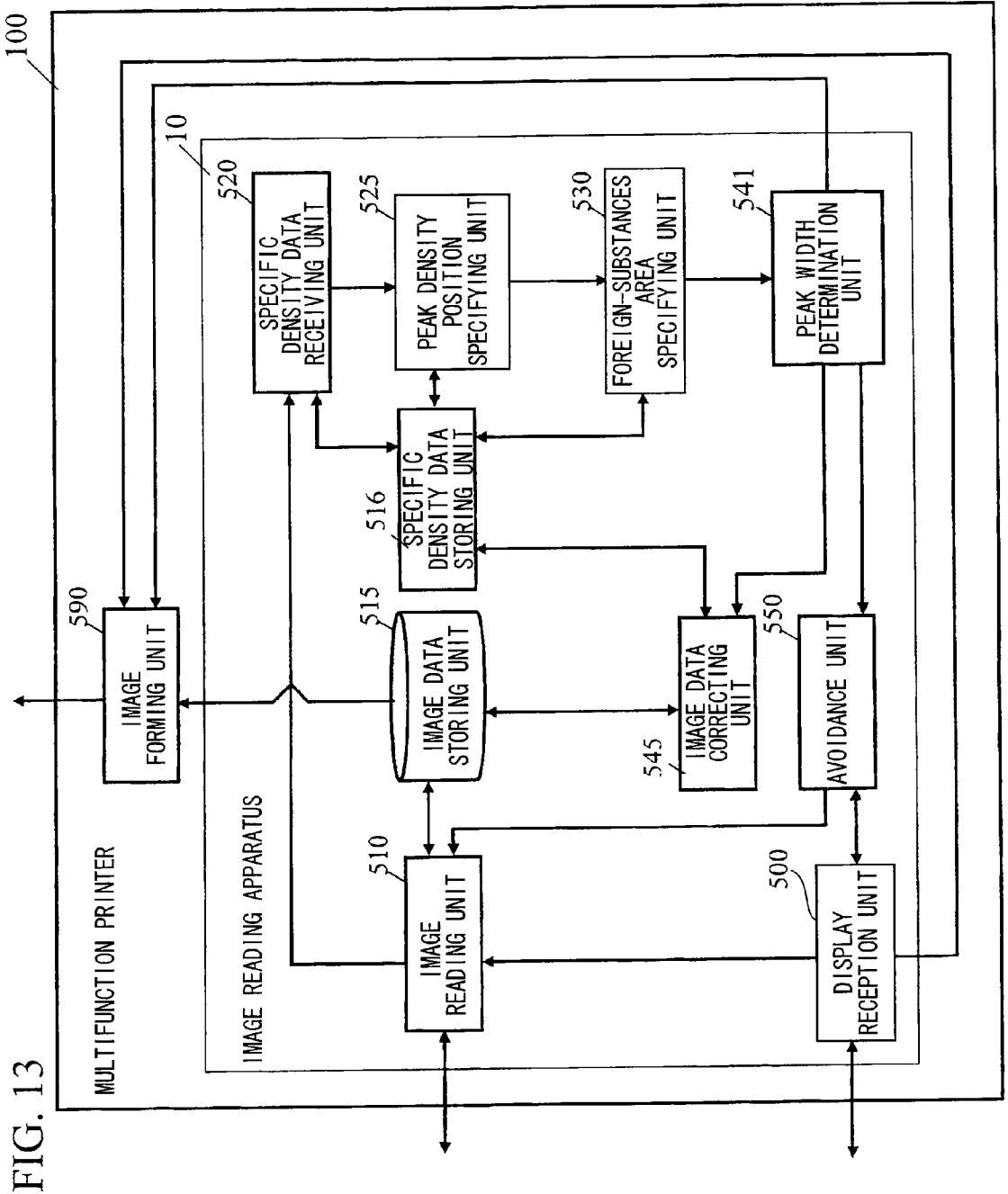
FIG. 13 is a block diagram illustrating functions of the image reading apparatus and the image forming apparatus in accordance with a second preferred embodiment of the present invention.
Figure 14:
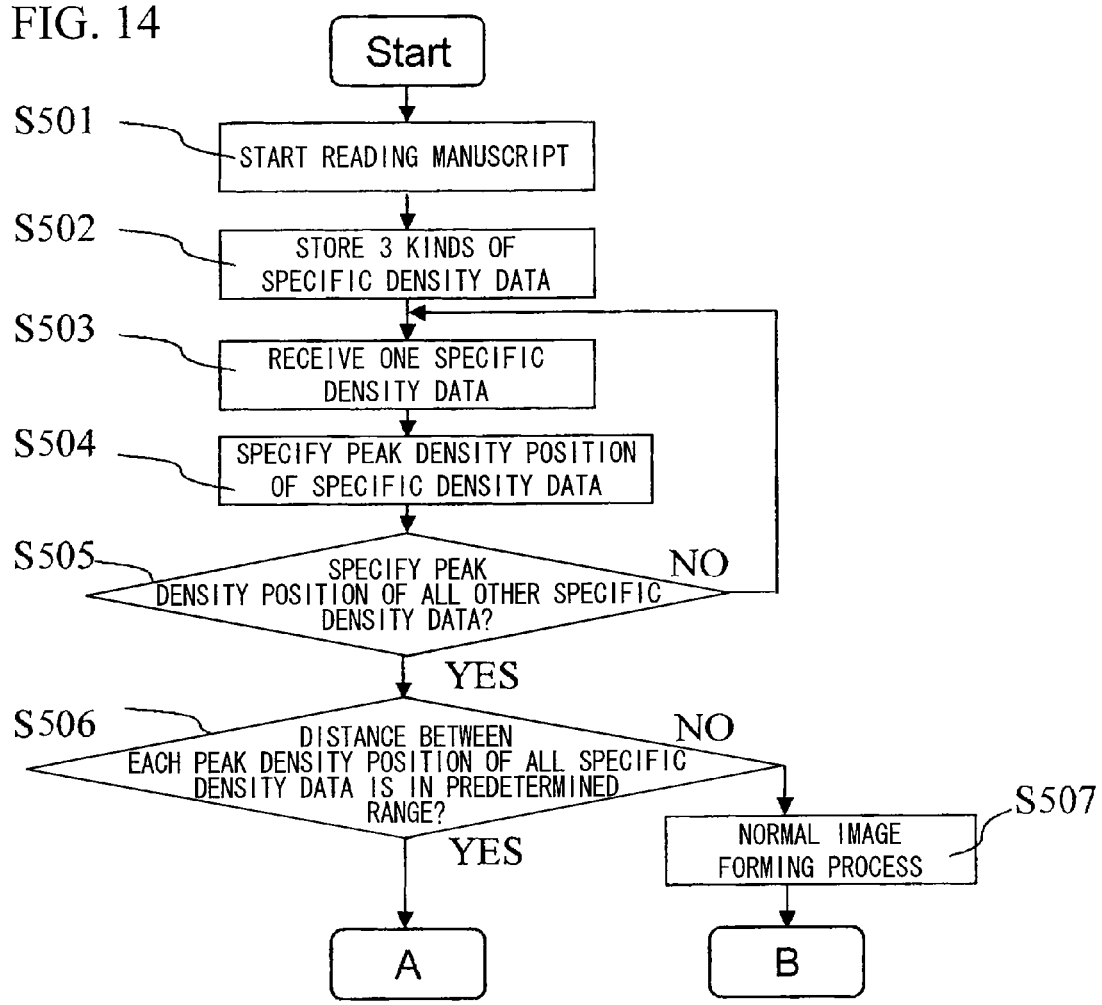
FIG. 14 is a flow chart illustrating a process of correcting the image data in the image reading apparatus in accordance with the second preferred embodiment of the present invention.
Figure 15:
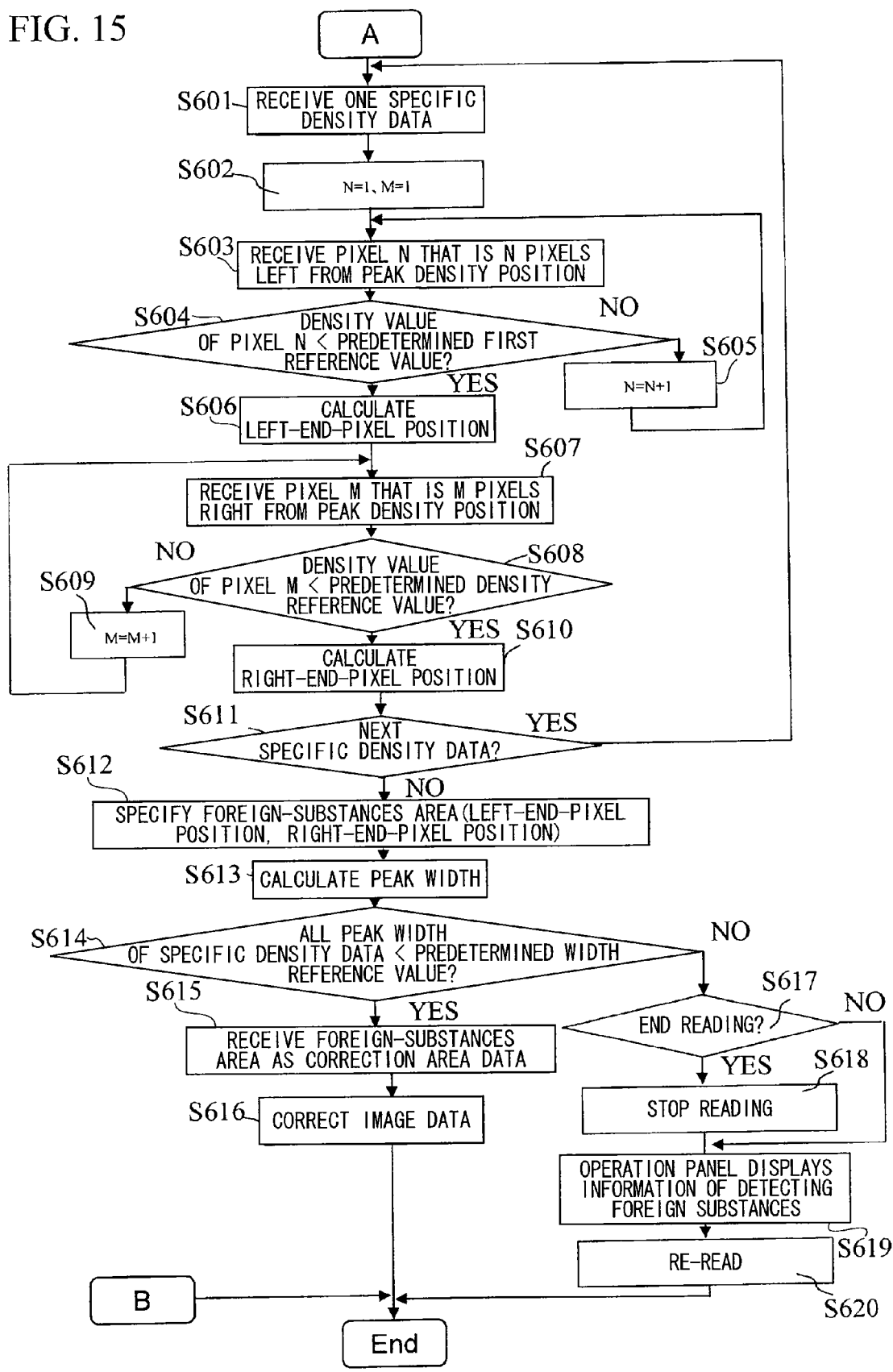
FIG. 15 is a flow chart illustrating a process of correcting the image data in the image reading apparatus in accordance with the second preferred embodiment of the present invention.

Next, the process of correcting the black line by the image reading apparatus 10 in accordance with the second preferred embodiment of the present invention will be described referring from FIG. 13 to FIG. 20. The configuration of the image forming apparatus in accordance with the second preferred embodiment of the present invention is the same as the first preferred embodiment of the present invention. FIG. 13 is a block diagram illustrating functions of the multifunction printer 100 including the image reading apparatus 10 in accordance with a second preferred embodiment of the present invention. FIG. 14 and FIG. 15 are flow charts illustrating the process of correcting the image data by the multifunction printer 100 in accordance with the second preferred embodiment of the present invention.

The multifunction printer 100 in accordance with the second preferred embodiment of the present invention includes the image reading apparatus 10 and the image forming unit 590. The image reading apparatus 10 includes the display reception unit 500, the image reading unit 510, the image data storing unit 515, the specific density data storing unit 516, the specific density data receiving unit 520, the peak density position specifying unit 525, the foreign-substances area specifying unit 530, the peak-width determination unit 541, the image data correcting unit 545, and the avoidance unit 550.

First, the document is set on the auto document feed apparatus 104 by a user. If the setting conditions are input, the display reception unit 500 receives the setting condition.

If the start key 305 of the operation unit 200 is pushed by a user, then the image reading unit 510 starts reading of the document (S501 of FIG. 14). That is, if the first document is transmitted to the reading position P, the image reading unit 510 reads the image data in series, from the front-end of the document, in each horizontal scanning line.

The data that is read by the image reading unit 510 is stored in the image data storing unit 515 as the density data (the data of the density value of each pixel of each horizontal scanning line). The density data is such that each pixel of the horizontal scanning line corresponds to the data in 256 shades of gray (0: white, 255: black). The image data storing unit 515 stores the density data in a unit of the density data (the image data) of one piece of document. Then, the density data of the horizontal scanning line C, which is the line between documents, is not stored in the image data storing unit 515.

Figure 16:
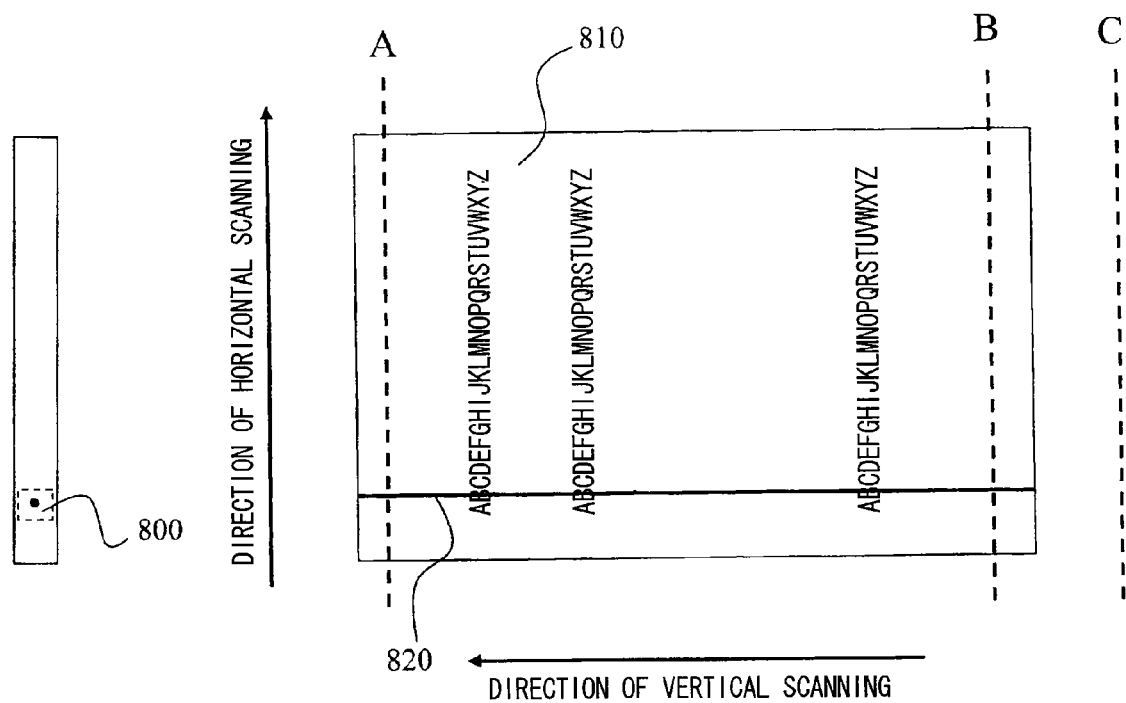
FIG. 16 is a view illustrating a relationship between image data and the block line in accordance with the second preferred embodiment of the present invention.

If the image reading unit 510 starts reading of the document, then the image data storing unit 515 stores the image data of the document that is read, and the specific density data receiving unit 520 detects the density data of the 3 lines, the horizontal scanning line A, the horizontal scanning line B, and the horizontal scanning line C, that are illustrated in FIG. 16, as the specific density data.

Here, the horizontal scanning line A is the line that is predetermined lines after the front-end of the document in the direction of vertical scanning (in the direction of transmitting the document). The horizontal scanning line B is the line that is predetermined lines before the back-end of the document in the direction of vertical scanning. The horizontal scanning line C is a between-papers-area that is the area between the document and the next document. In the between-papers-area, the density data of a white sheet (surface of the platen cover 102) is detected through the contact glass.

In the second preferred embodiment of the present invention, the horizontal scanning line A is 6 mm after the front-end line of the document in the direction of vertical scanning. The horizontal scanning line B is 6 mm before the back-end line of the document in the direction of vertical scanning. In general, the area, where the distance from the front-end line or the back-end line is less than 6 mm, is thought to be the area of the white paper. The density data, which is read this line, is possibly resulting from the foreign substance 800 that is illustrated in FIG. 16.

The timing, which the specific density data receiving unit 520 detects the density data of the horizontal scanning line A, the horizontal scanning line B, and the horizontal scanning line C, may be based on a commonly known method. For example, if the sensor T, which is disposed on the document feed path 108, detects the front-end of the transmitted document, then the detection signal is output to the specific density data receiving unit 520. The specific density data receiving unit 520 recognizes the timing that the image reading unit 510 reads the front-end of the document based on the detection signal. The specific density data receiving unit 520 recognizes the timing of reading the horizontal scanning line A, which is 6 mm after the front-end of the document.

If the transmission distance of the document is known, then the specific density data receiving unit 520 can recognize the back-end of the document. For example, the paper size of the document and height and width of the document are stored beforehand in a storage unit, which is not illustrated in the figure, linking to each other. The transmission distance is calculated by acquiring the height and width of the document corresponding to the paper size from the storage unit. The specific density data receiving unit 520 recognizes the timing that the image reading unit 510 reads the back-end of the document by adding the transmission distance of the document to the front-end of the document. As a result, the specific density data receiving unit 520 recognizes the timing that the image reading unit 510 reads the horizontal scanning line B, which is 6 mm before the back-end of the document, based on the back-end of the document.

After recognizing the timing of reading the back-end of the document, the specific density data receiving unit 520 recognizes the timing of the horizontal scanning line C, which is the next line of the back-end of the document.

If the specific density data receiving unit 520 detects the density data of 3 lines, the horizontal scanning line A, the horizontal scanning line B, and the horizontal scanning line C in series, then the specific density data are stored in the specific density data storing unit 516 in series (S502 of FIG. 14).

Figure 17:
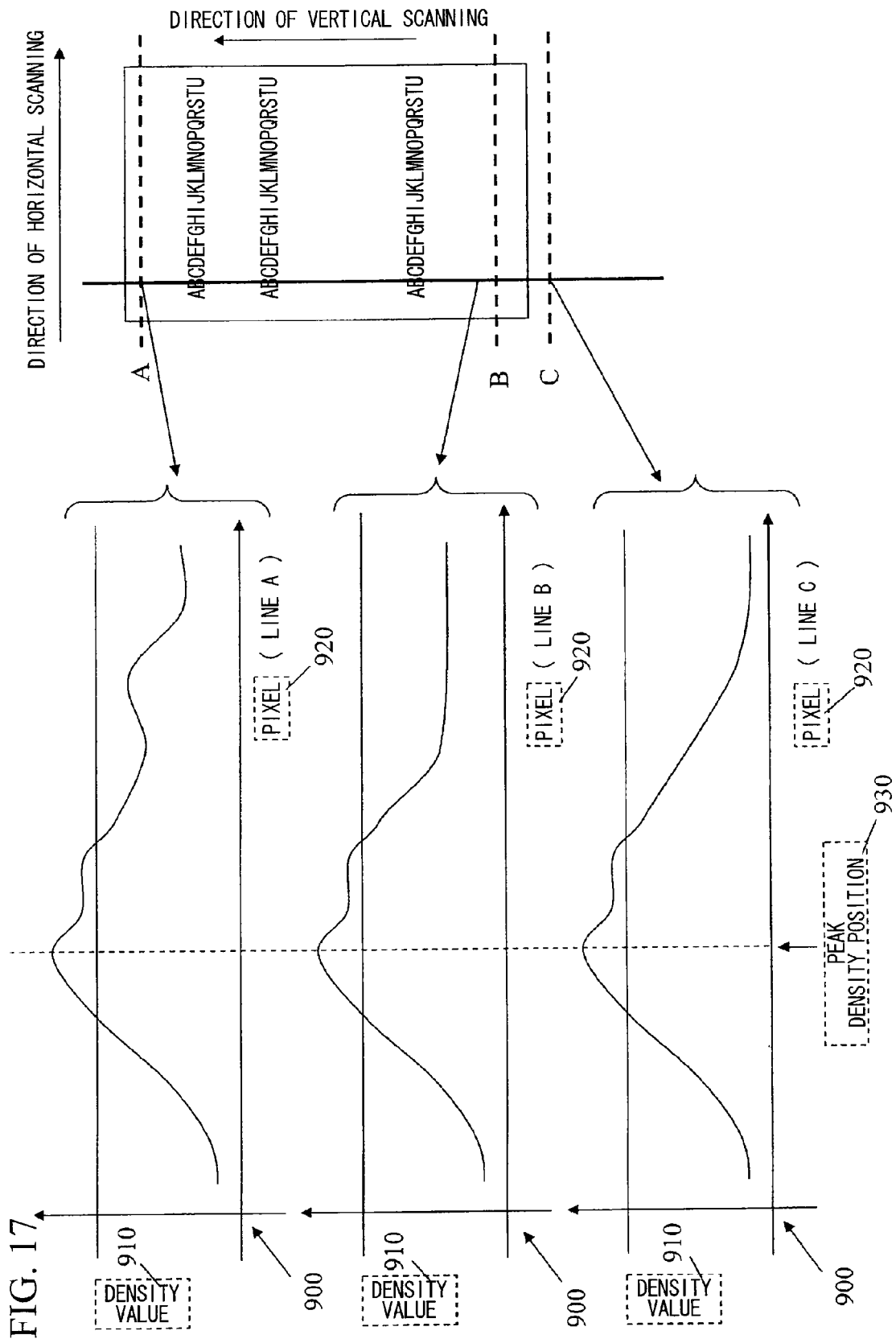
FIG. 17 is a view illustrating a relationship between the image data and density data in accordance with the second preferred embodiment of the present invention.

FIG. 17 is a specific density data graph 900 illustrating the specific density dada corresponding to each horizontal scanning line to describe below. The horizontal axis is the pixel 920 corresponding to the coordinate in direction of horizontal scanning. The vertical axis is the density value 910 corresponding to the pixel 920.

If the specific density data receiving unit 520 makes the specific density data stored in the specific density data storing unit 516, then the specific density data receiving unit 520 reports the peak density position specifying unit 525 that the specific density data is stored in the specific density data storing unit 516.

Then, the peak density position specifying unit 525 receives one of the density data from the specific density data storing unit 516 (S503 of FIG. 14), and detects increase and decrease of the density value of the density data. In this way, the peak density position specifying unit 525 detects the peak-density position (the position of the pixel which density is more than the predetermined density) (S504 of FIG. 14). The peak-density position may be more than one. The peak-density position may be the position of the highest density of the specific density data.

The peak density position specifying unit 525 repeats the above operation till detecting all peak-density position of the density data corresponding to the 3 lines ("No" in S505 of FIG. 14).

Figure 18:
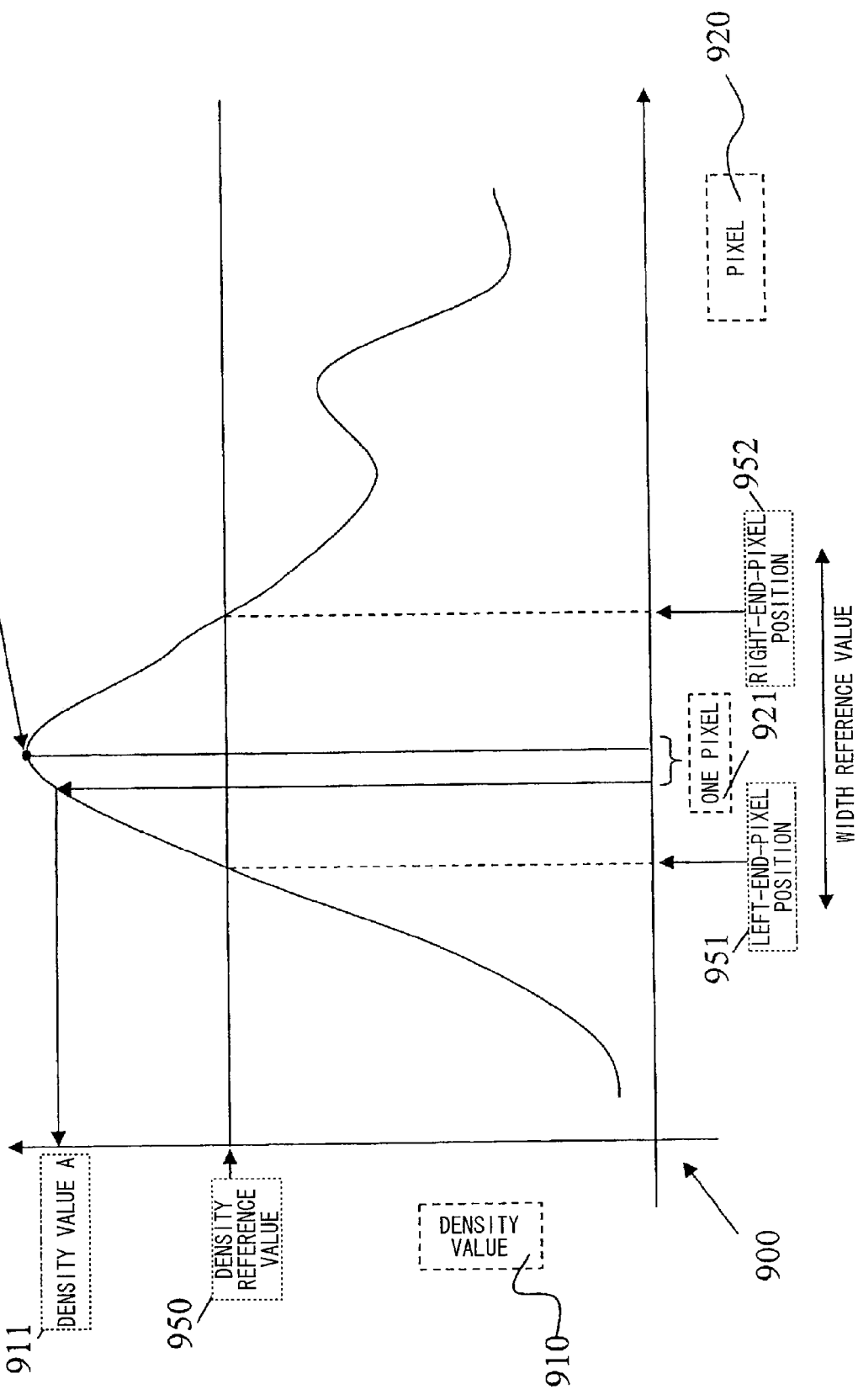
FIG. 18 is a view illustrating a graph of the density data in accordance with the second preferred embodiment of the present invention.

In the second preferred embodiment, the peak density position specifying unit 525 detects the peak-density position (the position of pixel) corresponding to a peak 930 of the density data graph 900 illustrated in FIG. 18.

If the peak density position specifying unit 525 detects all peak-density position corresponding to the 3 lines ("Yes" in S505 of FIG. 14), then the specific density data, which corresponds to the 3 lines, is related to the detected peak-density position and stored in the specific density data storing unit 516. Then, the peak density position specifying unit 525 reports to the foreign-substances area specifying unit 530 that the peak-density position of the density data is detected.

Then, the foreign-substances area specifying unit 530 respectively acquires the peak-density position corresponding to each specific density data from the specific density data storing unit 516. The foreign-substances area specifying unit 530 determines whether or not the difference of the acquired peak-density positions is within the predetermined range (S506 of FIG. 14).

If the difference of the peak-density data of each specific density data is within the predetermined range, then the foreign-substances area specifying unit 530 specifies the foreign-substances area by calculating a peak-width ("Yes" in S506 and "A" of FIG. 14). The predetermined range may be set arbitrary by a user. In the second preferred embodiment, the predetermined range is within 3 pixels. The peak-width is a length of a plurality of successive peak density position in the direction of horizontal scanning.

If the difference of the peak-density data of each specific density data is not within the predetermined range, then the foreign-substances area specifying unit 530 determines that there is no foreign-substances area, and the normal image forming process is performed without the process described below ("No" in S506 and S507 of FIG. 14).

If the difference of the peak-density position of each specific density data is within the predetermined range, then the foreign-substances area specifying unit 530 acquires the specific density data related to each peak-density position (the specific density data of the horizontal scanning line A, for example) from the specific density data storing unit 516 ("A" and S601 of FIG. 15).

If the foreign-substances area specifying unit 530 acquires the density data related to the peak-density position, then the density value of the pixel that is one pixel left from the pixel of the peak-density position (S602 and S603 of FIG. 15). Then, the foreign-substances area specifying unit 530 compares the acquired density value with a first standard value that is set beforehand (S604 of FIG. 15). The first standard value is the density value that becomes a standard (threshold) when determining that the black line should be removed, and is a predetermined specific density value in 256 shades of gray.

In the second preferred embodiment, the foreign-substances area specifying unit 530 acquires a peak-density value A 911 corresponding to the pixel that is one pixel 921 left from the peak-density position, and compares the density value A 911 with the density value of the first standard value.

If the density value A 911 is more than the density data of the first standard value, then the foreign-substances area specifying unit 530 acquires the density value of the pixel that is further one pixel left from the peak-density position, and compares the acquired density value with the density value of the first standard value.

The foreign-substances area specifying unit 530 repeats the above operation till the pixel which density value is equal to or more than the density value of the first standard value (or less than the density value of the first standard value) is acquired ("No" in S604, S605 and S603 of FIG. 15). If the foreign-substances area specifying unit 530 acquires the pixel which density value is equal to or more than the density value of the first standard value (or less than the density value of the first standard value), then the position of the pixel (left-end pixel position) is calculated based on the peak-density position ("Yes" if S604 and S606 of FIG. 15).

In the second preferred embodiment, the foreign-substances area specifying unit 530 calculates the left-end pixel position 951 that is the position of the pixel having the same density value as the first standard value 950.

If the foreign-substances area specifying unit 530 calculates the left-end pixel position 951, then the density value that is one pixel right from the peak-density position is acquired (S607 of FIG. 15). Then the foreign-substances area specifying unit 530 compares the acquired density value with the first standard value. By repeating the same operation as the operation of acquiring the left-end-pixel position ("No" in S608, S609 and S607 of FIG. 15), the foreign-substances area specifying unit 530 calculates the position of the pixel (right-end-pixel position) which density is equal to or less than the density value of the first standard value ("Yes" in S608 and S610 of FIG. 15). In this way, the foreign-substances area specifying unit 530 calculates both-end-pixel position (the left-end-pixel position and the right-end-pixel position) corresponding to the specific density data of the 3 lines ("Yes" in S611 of FIG. 15).

If the foreign-substances area specifying unit 530 calculates both-end-pixel position of the specific density data of each line, then the area between the left-end-pixel position and the right-end-pixel position is specified as a foreign-substances area. The foreign-substances area is related to the specific density data of the corresponding each line and stored in the specific density data storing unit 516. In the second preferred embodiment, the foreign-substances area specifying unit 530 specifies the foreign-substances area by calculating from the left-end-pixel position. But the foreign-substances area may be specified by calculating from the right-end-pixel position.

If the foreign-substances area specifying unit 530 specifies the foreign-substances area of each line, then the foreign-substances area is reported to the peak-width determination unit 541. Then, the peak-width determination unit 541 acquires the left-end-pixel position and the right-end-pixel position of the foreign-substances area from the specific density data storing unit 516 and calculates the peak-width (S613 of FIG. 15).

Then, the peak-width determination unit 541 compares the peak-width with the size of a second standard value, which is set beforehand (S614 of FIG. 15). The second standard value is the width of the black line that can be corrected by the image reading apparatus 10.

If all peak-widths of the density data of each line is less than the width of the second standard value ("Yes" in S614 of FIG. 15), then the peak-width determination unit 541 determines that the image data can be corrected and reports to the image data correcting unit 545 that the image data is to be corrected.

Then, the image data correcting unit 545 acquires the foreign-substances area (the left-end-pixel position and the right-end-pixel position) of one of the specific density data as correction area data from the specific density data receiving unit 520 (S615 of FIG. 15). The image data correcting unit 545 corrects the image data (the unit of the image data of one piece of the document), which has been stored in the image data storing unit 515, based on the correction area data. The screen, which urges a user to instruct whether or not to correct the image data, may be displayed before correcting the image data. The configuration may be such that a user is inquired whether or not to correct the image data.

Various methods of correction the image data are known. The image data correcting unit 545 corrects the image data as described below, for example.

The image data correcting unit 545 acquires the pixel of one line from the image data, which has been stored in the image data storing unit 515. Then, the image data correcting unit 545 acquires the density value of the pixel, which is one pixel left from the left-end-pixel position of the correction area data, in the pixels of the one line. Then, the image data correcting unit 545 acquires the density value of the pixel, which is one pixel right from the right-end-pixel position, in the pixels of the one line.

The image data correcting unit 545 calculates a correction density value by calculating the mean value of the acquired density value of the pixel, which is one pixel left from the left-end-pixel position, and the acquired density value of the pixel, which is one pixel right from the right-end-pixel position.

The image data correcting unit 545 corrects the image data of one line by replacing the density data of the area between the left-end-pixel position and the right-end-pixel position of the pixel of one line of the image data with the correction density value. By repeating the above operation on each horizontal scanning line, the image data correcting unit 545 can correct the original image data.

Figure 19A:
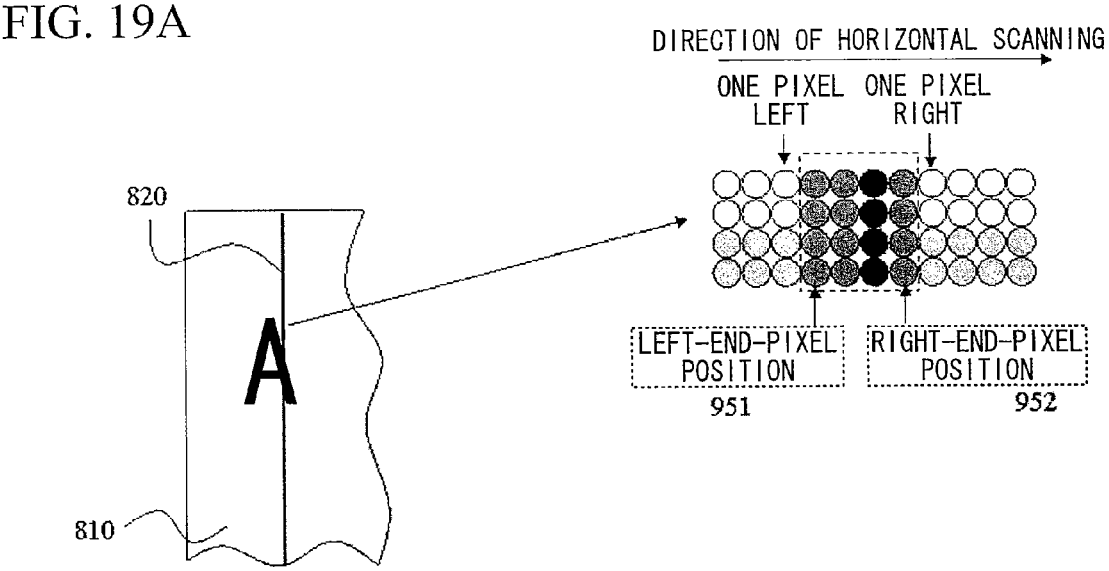
FIG. 19A is a view illustrating a process of correcting the image data in accordance with the second preferred embodiment of the present invention.
Figure 19B:
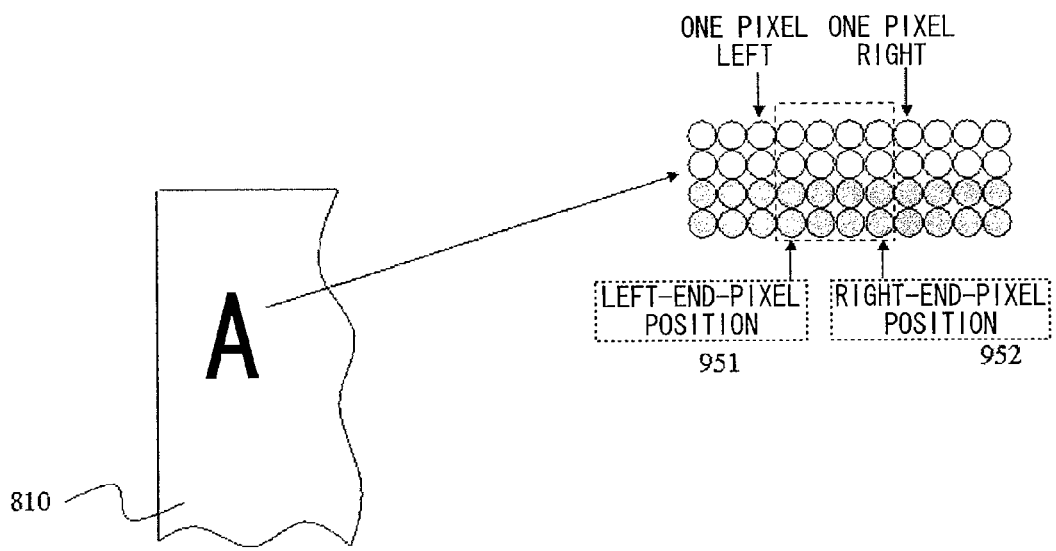
FIG. 19B is a view illustrating a process of correcting the image data in accordance with the second preferred embodiment of the present invention.

FIGS. 19A and 19B show the image data 810 and the pixels (each of which is represented as a circle) near the foreign-substances area of the image data. FIG. 19A corresponds to the state before the correction, and FIG. 19B corresponds to the state after the correction.

As illustrated in FIGS. 19A and 19B, the black line 820 that appears in the image data 810 before the correction illustrated in FIG. 19A disappears in FIG. 19B, by replacing the density value between the left-end-pixel position 951 and the right-end-pixel position 952 with the correction density value that is calculated by the image data correcting unit 545.

The peak-width determination unit 541 compares the peak-width of the foreign-substances area, which has been acquired from the specific density data storing unit 516, with the second standard value width. If at least one of the peak-width is more than the second standard value width, then it is determined that the image data cannot be corrected ("No" in S614 of FIG. 15). In this case, the peak-width determination unit 541 reports to the avoidance unit 550 that the image data cannot be corrected.

If the image forming unit 590 performs the operation of outputting the image, then the peak-width determination unit 541 orders the image forming unit 590 to stop the operation of outputting the image. Then, the image forming unit 590 stops the operation of outputting the image.

After the peak-width determination unit 541 reports to the avoidance unit 550 that the image data cannot be corrected, if the image reading unit 510 performs the operation of reading image, then the avoidance unit 550 orders the image reading unit 510 to stop the operation of reading image. Then, the image reading unit 510 stops the operation of reading image ("Yes" in S617 and S618 of FIG. 15).

The avoidance unit 550 orders the display reception unit 500 to make a user select the method of avoiding reading the foreign substances that causes the black line (S619 of FIG. 15).

Figure 20:
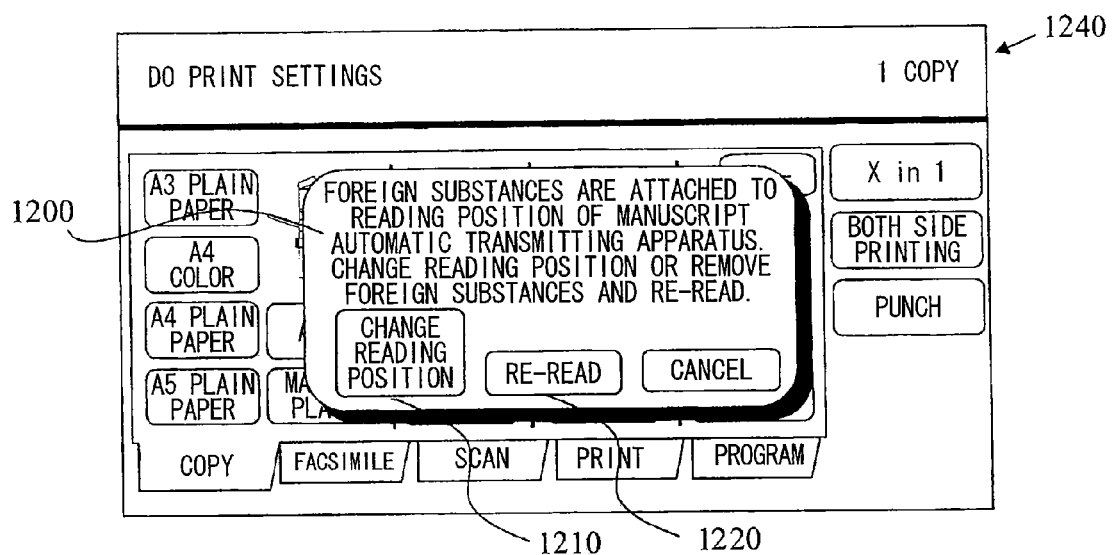
FIG. 20 is a view illustrating a screen of the operation unit in accordance with the second preferred embodiment of the present invention.

Then, the display reception unit 500 makes a foreign substance confirmation screen 1200 as illustrated in FIG. 20 pop up in an initial screen 1240. The foreign substance confirmation screen 1200 displays that the foreign substance is attached to the reading position and makes a user to select either of reading again after changing the reading position and reading again after removing the foreign substance, as the method of avoiding reading of the foreign substance.

If a user wants reading again after changing the reading position corresponding to the display of the foreign substance confirmation screen 1200, then the user pushes an item 1210 that changes the reading position. Then, the avoidance unit 550 orders the image reading unit 510 to read again the document after changing the reading position. Then, the image reading unit 510 reads again after moving the reading position for a predetermined distance in the direction of vertical scanning (S619 of FIG. 15).

If a user wants reading again after removing the foreign substance corresponding to the display of the foreign substance confirmation screen 1200, then the user removes the foreign substance and pushes an item 1220 that starts reading again. Then, the image reading unit receives the pushing and starts reading again (S620 of FIG. 15).

Either deleting the black line or changing the reading position may be settable, and if the peak-width determination unit 541 determines that the image data has the black line, then either of the process that the image data correcting unit 545 corrects the image data or the process that the avoidance unit 550 avoids reading of the foreign substances (the process that a user sets) may automatically performed.

After the peak-width determination unit 541 determines that the image data has the black line, if the image data can be corrected, then the image data correcting unit 545 may correct the image data automatically, and if the image data cannot be corrected, then the avoidance unit 550 may automatically avoid reading of the foreign substances.

In the second preferred embodiment, the image data correcting unit 545 corrects the image data by using the pixel that is one pixel left or right from the both end pixel position (the left-end-pixel position and the right-end-pixel position) of the foreign substances area of one of the specific density data. The peak-width determination unit 541 selects the left-end-pixel position that is far left of the foreign substances of the specific density data and the right-end-pixel position that is far right of the foreign substances of the specific density data, and calculates the maximum peak-width based on the left-end-pixel position and the right-end-pixel position. By comparing the maximum peak-width, which has been calculated, with the predetermined standard value width, if the maximum peak-width is within the predetermined standard value width, then the image data correcting unit 545 may correct the image data based on the left-end-pixel position, which is far left of the foreign substances of the specific density data, and the right-end-pixel position, which is far right of the foreign substances of the specific density data.

The display reception unit 500, the image reading unit 510, the image data storing unit 515, the specific density data storing unit 516, the specific density data receiving unit 520, the peak density position specifying unit 525, the foreign-substances area specifying unit 530, the peak-width determination unit 541, the image data correcting unit 545, the avoidance unit 550, and the image forming unit 590 are realized by the CPU 401 executing the program.

The program and the data that realize the display reception unit 500, the image reading unit 510, the image data storing unit 515, the specific density data storing unit 516, the specific density data receiving unit 520, the peak density position specifying unit 525, the foreign-substances area specifying unit 530, the peak-width determination unit 541, the image data correcting unit 545, the avoidance unit 550, and the image forming unit 590 are stored in the ROM 402, the HDD 404, etc.

According to the second preferred embodiment of the present invention, it is easily determined whether or not the black line can be corrected by calculating the width of the black line in the image data. Therefore, the image reading apparatus or the image forming apparatus including the image reading apparatus in accordance with the second preferred embodiment is used in the copy machine, the printer, the scanner, the multifunction printer, etc.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the claims.

What is claimed is:

1. An image reading apparatus that reads a document being transmitted in a direction of vertical scanning comprising:
   a timing predicting unit that predicts a reading-start-timing of the document by detecting a front-end of the document, the timing predicting unit predicting a reading-end-timing of the document by detecting a back-end of the document;
   an image reading unit that starts reading a horizontal scanning line of the document at the reading-start-timing, the image reading unit reading a line between documents at the reading-end-timing, the image reading unit generating density data of pixels on one of the horizontal scanning line of the document and the line between documents;
   a line density data classification unit that classifies the density data, which has been generated by the image reading unit, into first density data of a first line, second density data of a second line, and third density data of a third line, the first line being the horizontal scanning line that is a predetermined distance backward from the front-end, the second line being the horizontal scanning line of the document other than the first line, the third line being the line between documents;
   a first specific density data storage unit that stores the first density data as first specific density data;
   a second specific density data storage unit that stores a predetermined number of the second density data as second specific density data, including the second density data of a latest line that is the horizontal scanning line being read at the reading-end-timing;
   a third specific density data storage unit that stores the third density data as third specific density data;
   a determination unit that determines whether or not a foreign substance is attached to a reading position at which the image reading unit reads the document based on at least one of the first, second and third specific density data; and
   a peak density position specifying unit that specifies a peak density position of one of the first, second and third lines based on one of the first, second and third specific density data corresponding to one of the first, second and third lines, the peak density position being a position of a pixel that has a density value more than a first predetermined density standard value in one of the first, second and third lines, wherein
   if a difference of distance in a direction of horizontal scanning between the peak density position of one of the first, second and third lines and the peak density position of another one of the first, second and third lines is less than a predetermined distance and a density value of the pixel at the peak density position is more than a second predetermined density standard value, then the determination unit determines that the foreign substance is attached to the reading position.

2. The image reading apparatus according to claim 1, wherein the number of the lines corresponding to the density data that the line density data classification unit classifies can be set arbitrarily.

3. The image reading apparatus according to claim 1, wherein the number of the second specific density data that the second specific density data storage unit stores can be set arbitrarily.

4. The image reading apparatus according to claim 1, further comprising:
an avoidance unit that changes the reading position, if the determination unit determines that the foreign substance is attached to the reading position.

5. An image reading apparatus that reads a document being transmitted in a direction of vertical scanning, comprising:
an image reading unit that reads a horizontal scanning line of the document, the image reading unit generating density data of pixels on the horizontal scanning line;
a specific density data receiving unit that receives a plurality of number of specific density data, each of the specific density data being the density data that has been generated by the image reading unit;
a peak density position specifying unit that specifies a peak density position of the horizontal scanning line based on the specific density data, the peak density position being a position of a pixel that has a density value more than a first predetermined density standard value in the horizontal scanning line; and
a foreign substance area specifying unit that specifies a foreign substance area, the foreign substance area being an area where the density value of the pixel at the peak density position is more than a second predetermined density standard value, if a difference of a distance in a direction of horizontal scanning between the peak density position of one horizontal scanning line and the peak density position of another horizontal scanning line is less than a predetermined distance.

6. The image reading apparatus according to claim 5, further comprising:
an image data storing unit that stores the density data that has been read by the image reading unit;
a peak-width determination unit that calculates a peak-width of the density data based on the foreign substance area, which has been specified by the foreign substance area specifying unit, the peak-width determination unit determining whether or not the peak-width is less than a predetermined width standard value, by comparing the peak-width, which has been calculated, with the predetermined width standard value; and
an image data correcting unit that acquires the foreign substance area, which has been specified by the foreign substance area specifying unit, as a correction area data, if the peak-width is equal to or less than the predetermined width standard value, and wherein
the image data correcting unit corrects the density data, which has been stored by the image data storing unit, based on the correction area data.

7. The image reading apparatus according to claim 5, wherein
the specific density data, which has been received by the specific density data receiving unit, includes first specific density data of a first line, second specific density data of a second line, and third specific density data of a third line, the first line being the horizontal scanning line that is a first predetermined distance backward from a front-end line of the document, the second line being the horizontal scanning line that is a second predetermined distance forward from a back-end line of the document, the third line being a line between documents, and
if all of a first density value of pixels of the peak density position of the first line, a second density value of pixels of the peak density position of the second line, and a third density value of pixels of the peak density position of the third line are more than the second predetermined density standard value, then the foreign substance area specifying unit specifies the foreign substance area.

8. The image reading apparatus according to claim 7, wherein
if all of the peak-width of the first specific density data, the peak-width of the second specific density data, and the peak-width of the third specific density data are equal to or less than the predetermined width standard value, then the image data correcting unit receives one of the foreign substance area of the first line, the foreign substance area of the second line, and the foreign substance area of the third line as the correction area data.

9. The image reading apparatus according to claim 7, further comprising:
an avoidance unit that changes a position of a light source that is irradiated to the image reading unit, if at least one of the peak-width of the first line, the peak-width of the second line, and the peak-width of the third line is more than the predetermined width standard value.

10. An image forming apparatus comprising:
an image reading apparatus that reads a document being transmitted in a direction of vertical scanning to generate density data; and
an image forming unit that prints the density data, which has been generated by the image reading apparatus,
wherein the image reading apparatus comprising:
an image reading unit that reads a horizontal scanning line of the document, the image reading unit generating the density data of pixels on the horizontal scanning line;
a specific density data receiving unit that receives a predetermined number of specific density data, each of the specific density data being the density data that has been generated by the image reading unit;
a peak density position specifying unit that specifies a peak density position of the horizontal scanning line based on the specific density data, the peak density position being a position of a pixel that has a density value more than a first predetermined density standard value in the horizontal scanning line; and
a foreign substance area specifying unit that specifies a foreign substance area, the foreign substance area being an area where a density value of the pixel at the peak density position is more than a second predetermined density standard value, if a difference of a distance in a direction of horizontal scanning between the peak density position of one horizontal scanning line and the peak density position of another horizontal scanning line is less than a predetermined distance.

11. The image forming apparatus according to claim 10, wherein the image reading apparatus further comprising:
an image data storing unit that stores the density data that has been read by the image reading unit;
a peak-width determination unit that calculates a peak-width of the density data based on the foreign substance area, which has been specified by the foreign substance area specifying unit, the peak-width determination unit determining whether or not the peak-width is less than a predetermined width standard value, by comparing the peak-width, which has been calculated, with the predetermined width standard value; and
an image data correcting unit that acquires the foreign substance area, which has been specified by the foreign substance area specifying unit, as a correction area data, if the peak-width is equal to or less than the predetermined width standard value, the image data correcting unit correcting the density data, which has been stored by the image data storing unit, based on the correction area data.

12. The image forming apparatus according to claim 10, wherein the specific density data, which has been received by the specific density data receiving unit, includes first specific density data of a first line, second specific density data of a second line, and third specific density data of a third line, the first line being the horizontal scanning line that is a first predetermined distance backward from a front-end line of the document, the second line being the horizontal scanning line that is a second predetermined distance forward from a back-end line of the document, the third line being a line between documents, and if all of a first density value of pixels of the peak density position of the first line, a second density value of pixels of the peak density position of the second line, and a third density value of pixels of the peak density position of the third line are more than the second predetermined density standard value, then the foreign substance area specifying unit specifies the foreign substance area.

13. The image forming apparatus according to claim 12, wherein if all of the peak-width of the first specific density data, the peak-width of the second specific density data, and the peak-width of the third specific density data are equal to or less than the predetermined width standard value, then the image data correcting unit receives one of the foreign substance area of the first line, the foreign substance area of the second line, and the foreign substance area of the third line as the correction area data.

14. The image forming apparatus according to claim 12, wherein the image reading apparatus further comprising:

an avoidance unit that changes a position of a light source that is irradiated to the image reading unit, if at least one of the peak-width of the first line, the peak-width of the second line, and the peak-width of the third line is more than the predetermined width standard value.

15. The image forming apparatus according to claim 10, wherein the image reading apparatus further comprising:

a timing predicting unit that predicts a reading-start-timing of the document by detecting a front-end of the document, the timing predicting unit predicting a reading-end-timing of the document by detecting a back-end of the document; and a line density data classification unit that classifies the density data, which has been generated by the image reading unit, into first density data of a first line, second density data of a second line, and third density data of a third line, the first line being the horizontal scanning line that is a predetermined distance backward from the front-end line, the second line being the horizontal scanning line of the document other than the first, the third line being a line between documents;

a first specific density data storage unit that stores the first density data as first specific density data;

a second specific density data storage unit that stores a predetermined number of the second density data as second specific density data, including the second density data of a latest line that is the horizontal scanning line being read at the reading-end-timing;

a third specific density data storage unit that stores the third density data as third specific density data; and a determination unit that determines whether or not a foreign substance is attached to a reading position at which the image reading unit reads the document based on at least one of the first, second and third specific density data, and if a difference of distance in the direction of horizontal scanning between the peak density position of one of the first, second and third lines and the peak density position of another one of the first, second and third lines is less than a predetermined distance and a density value of the pixel at the peak density position is more than a second predetermined density standard value, then the determination unit determines that the foreign substance is attached to the reading position.

16. The image forming apparatus according to claim 15, wherein the number of the lines corresponding to the density data that the line density data classification unit classifies can be set arbitrarily.

17. The image forming apparatus according to claim 15, wherein the number of the second specific density data that the second specific density data storage unit stores can be set arbitrarily.

18. The image forming apparatus according to claim 15, wherein the image reading apparatus further comprising:

an avoidance unit that changes the reading position, if the determination unit determines that the foreign substance is attached to the reading position.

* * * * *